(12) United States Patent
Willison et al.

(10) Patent No.: US 11,485,215 B1
(45) Date of Patent: Nov. 1, 2022

(54) LAND VEHICLES INCORPORATING ELECTRIC MOTORS AND METHODS THEREFOR

(71) Applicant: Workhorse Group Inc., Loveland, OH (US)

(72) Inventors: Robert Willison, Lebanon, OH (US); Donald L. Wires, Loveland, OH (US); Gary Cain, Loveland, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 17/546,593

(22) Filed: Dec. 9, 2021

(51) Int. Cl.
*B60K 1/04* (2019.01)
*B60L 50/60* (2019.01)
*B60K 7/00* (2006.01)

(52) U.S. Cl.
CPC .............. *B60K 1/04* (2013.01); *B60K 7/0007* (2013.01); *B60L 50/66* (2019.02); *B60K 2001/0438* (2013.01)

(58) Field of Classification Search
CPC .......... B60K 2021/0438; B60K 7/0007; B60K 1/04; B60L 50/66
See application file for complete search history.

(56) References Cited

U.S. PATENT DOCUMENTS

| | | |
|---|---|---|
| 1,251,749 A | 1/1918 | Cilley |
| 1,728,889 A | 9/1929 | Kemble |
| 2,973,220 A | 2/1961 | White |
| 3,066,621 A | 12/1962 | Dean et al. |
| 4,270,622 A | 6/1981 | Travis |
| 4,676,545 A | 6/1987 | Bonfilio et al. |
| 4,934,733 A | 6/1990 | Smith et al. |
| 5,363,939 A | 11/1994 | Catlin |
| 5,690,378 A | 11/1997 | Romesburg |
| 5,829,542 A | 11/1998 | Lutz |
| 6,893,046 B2 | 5/2005 | Ledesma et al. |
| 6,926,351 B2 | 8/2005 | Telehowski et al. |

(Continued)

FOREIGN PATENT DOCUMENTS

| | | |
|---|---|---|
| CN | 103359174 A | 10/2013 |
| CN | 110884568 A | 3/2020 |

(Continued)

OTHER PUBLICATIONS

International Search Report; International Searching Authority; International Patent Application No. PCT/US2022/014852; dated Apr. 18, 2022; 2 pages.

(Continued)

*Primary Examiner* — James A English
*Assistant Examiner* — James J Triggs
(74) *Attorney, Agent, or Firm* — Taft Stettinius & Hollister LLP

(57) ABSTRACT

Land vehicles and methods of operating land vehicles are disclosed. A land vehicle includes a frame structure, a plurality of wheels, and a plurality of electric motors. The frame structure includes a front cage that at least partially defines an operator cabin and a rear compartment positioned rearward of the front cage in a longitudinal direction. The plurality of wheels are supported by the frame structure. The plurality of wheels includes a pair of front wheels and a pair of rear wheels positioned rearward of the pair of front wheels in the longitudinal direction.

16 Claims, 15 Drawing Sheets

(56) References Cited

U.S. PATENT DOCUMENTS

| | | |
|---|---|---|
| 6,954,152 B1 | 10/2005 | Matthews |
| 7,651,153 B2 | 1/2010 | Martin et al. |
| 8,641,133 B1 | 2/2014 | Scaringe et al. |
| 8,714,592 B1 | 5/2014 | Thoreson et al. |
| 9,103,535 B1 | 8/2015 | Strobel et al. |
| 10,801,169 B2 | 10/2020 | Roy et al. |
| 10,967,904 B2 | 4/2021 | Penz et al. |
| 2006/0158024 A1 | 7/2006 | Wendl |
| 2006/0273571 A1 | 12/2006 | Matsumoto et al. |
| 2007/0257570 A1 | 11/2007 | Walter et al. |
| 2008/0003321 A1 | 1/2008 | Kerr et al. |
| 2009/0032321 A1 | 2/2009 | Marsh et al. |
| 2010/0025132 A1 | 2/2010 | Hill et al. |
| 2010/0101900 A1 | 4/2010 | Usui |
| 2010/0108417 A1 | 5/2010 | Gilmore |
| 2010/0263954 A1 | 10/2010 | Constans |
| 2011/0017527 A1 | 1/2011 | Oriel et al. |
| 2013/0341971 A1 | 12/2013 | Masini et al. |
| 2014/0054916 A1 | 2/2014 | Knudtson et al. |
| 2014/0083606 A1 | 3/2014 | Masini et al. |
| 2014/0159468 A1 | 6/2014 | Heinen et al. |
| 2014/0182954 A1 | 7/2014 | Weber |
| 2014/0217991 A1* | 8/2014 | Wisniewski ........ H01M 50/209 320/137 |
| 2015/0027795 A1 | 1/2015 | Hirai et al. |
| 2015/0291017 A1 | 10/2015 | LaBiche |
| 2017/0050514 A1 | 2/2017 | Li |
| 2017/0113716 A1 | 4/2017 | Gong et al. |
| 2017/0225715 A1 | 8/2017 | Kobayashi et al. |
| 2017/0305253 A1 | 10/2017 | Perlo et al. |
| 2018/0037151 A1 | 2/2018 | Bauer et al. |
| 2018/0108891 A1 | 4/2018 | Fees et al. |
| 2018/0290627 A1 | 10/2018 | Hariri et al. |
| 2018/0337377 A1 | 11/2018 | Stephens et al. |
| 2018/0345777 A1 | 12/2018 | Bimschein et al. |
| 2019/0168678 A1* | 6/2019 | Magnuson ................ B60R 7/08 |
| 2019/0389444 A1 | 12/2019 | Kistner et al. |
| 2020/0062183 A1 | 2/2020 | Smith et al. |
| 2020/0369334 A1 | 11/2020 | Lee |
| 2021/0171120 A1 | 6/2021 | Kim et al. |

FOREIGN PATENT DOCUMENTS

| | | |
|---|---|---|
| DE | 102019109465 A1 | 10/2020 |
| EP | 1538072 A1 | 6/2005 |
| EP | 2552763 A2 | 2/2013 |
| EP | 3174680 A2 | 6/2017 |
| EP | 3689717 A1 | 8/2020 |
| FR | 2698601 A1 | 6/1994 |
| WO | 2016016662 A2 | 2/2016 |

OTHER PUBLICATIONS

Written Opinion of the International Searching Authority; International Searching Authority; International Patent Application No. PCT/US2022/014852; dated Apr. 18, 2022; 7 pages.

International Search Report; International Searching Authority; International Patent Application No. PCT/US2021/012327; dated Mar. 9, 2021; 2 pages.

Written Opinion of the International Searching Authority; International Searching Authority; International Patent Application No. PCT/US2021/012327; dated Mar. 9, 2021; 8 pages.

International Search Report; International Searching Authority; International Patent Application No. PCT/US2021/012330; dated Mar. 9, 2021; 2 pages.

Written Opinion of the International Searching Authority; International Searching Authority; International Patent Application No. PCT/US2021/012330; dated Mar. 9, 2021; 9 pages.

International Search Report; International Searching Authority; International Patent Application No. PCT/US2021/012332; dated Mar. 24, 2021; 2 pages.

Written Opinion of the International Searching Authority; International Searching Authority; International Patent Application No. PCT/US2021/012332; dated Mar. 24, 2021; 7 pages.

Supplementary European Search Report; European Patent Office; European Application No. 21710384.5; dated Oct. 21, 2021; 12 pages.

International Search Report; International Searching Authority; International Patent Application No. PCT/US2022/014851; dated Apr. 25, 2022; 2 pages.

Written Opinion of the International Searching Authority; International Searching Authority; International Patent Application No. PCT/US2022/014851; dated Apr. 25, 2022; 7 pages.

International Search Report; International Searching Authority; International Patent Application No. PCT/US2022/014847; dated Mar. 8, 2022; 3 pages.

Written Opinion of the International Searching Authority; International Searching Authority; International Patent Application No. PCT/US2022/014847; dated Mar. 8, 2022; 6 pages.

International Search Report; International Searching Authority; International Patent Application No. PCT/US2022/014844; dated Mar. 16, 2022; 2 pages.

Written Opinion of the International Searching Authority; International Searching Authority; International Patent Application No. PCT/US2022/014844; dated Mar. 16, 2022; 7 pages.

\* cited by examiner

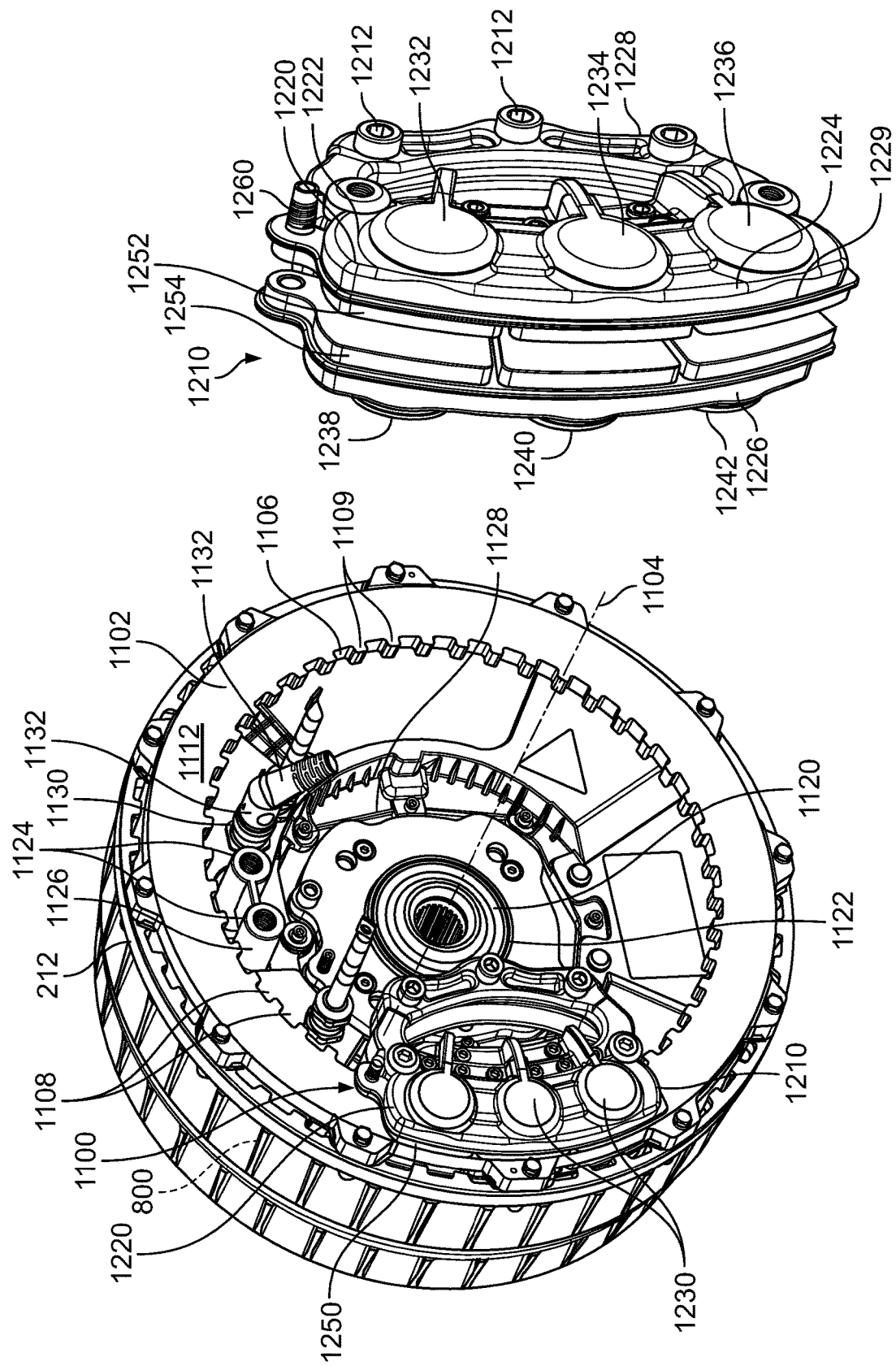

LAND VEHICLES INCORPORATING ELECTRIC MOTORS AND METHODS THEREFOR

TECHNICAL FIELD

The present disclosure generally relates to land vehicles incorporating electric motors, and, more particularly, to utility and delivery vehicles incorporating electric motors.

BACKGROUND

Powertrain devices and/or systems that include one or more gas-powered motors may suffer from a variety of drawbacks, particularly when incorporated into, or designed for use with, land vehicles such as utility and delivery vehicles, for example. In addition, brake systems for land vehicles may have various shortcomings. For those reasons, among others, powertrain devices and/or brake systems that avoid the limitations of conventional components remain an area of interest.

SUMMARY

The present disclosure may comprise one or more of the following features and combinations thereof.

According to one aspect of the present disclosure, a land vehicle may include a frame structure, a plurality of wheels supported by the frame structure, a plurality of electric motors to generate rotational power that are supported by the plurality of wheels, and a power cell assembly to supply electrical power to the plurality of electric motors that is supported by the frame structure. The frame structure may include a front cage that at least partially defines an operator cabin and a rear compartment positioned rearward of the front cage in a longitudinal direction. The plurality of wheels may include a pair of front wheels and a pair of rear wheels positioned rearward of the pair of front wheels in the longitudinal direction. The plurality of electric motors may include a first electric motor integrated directly into one of the pair of front wheels, a second electric motor integrated directly into the other of the pair of front wheels, a third electric motor integrated directly into one of the pair of rear wheels, and a fourth electric motor integrated directly into the other of the pair of rear wheels. The power cell assembly may be at least partially housed by a carrier positioned between the pair of front wheels and the pair of rear wheels in the longitudinal direction.

In some embodiments, the operator cabin may include a steering wheel, an operator seat, and a rack arranged in the operator cabin opposite the steering wheel and the operator seat that includes a plurality of trays. The operator cabin may include a pair of tracks affixed to a floor of the operator cabin and spaced apart from one another in the longitudinal direction, and the rack may be movable along the pair of tracks in a lateral direction perpendicular to the longitudinal direction between a stowed position, in which the rack is disposed distant from the operator seat, and a delivery position, in which the rack is disposed close to the operator seat. The land vehicle may have a gross vehicular weight rating (GVWR) of between 10,001 pounds and 14,000 pounds.

In some embodiments, each of the plurality of electric motors may be configured to generate about 100 horsepower (hp). The power cell assembly may include a modular system having one or more battery pack modules each configured to supply electrical power to the plurality of electric motors in use of the vehicle, and in use of the vehicle, battery pack modules may be added to, or removed from, the modular system depending on a particular delivery mission of the vehicle.

In some embodiments, each of the plurality of electric motors may be coupled to one of the plurality of wheels without any transmission gearing interposed therebetween. The land vehicle may not include an internal combustion engine.

In some embodiments, the power cell assembly may include a bottom tray, a casing supported by the bottom tray that houses a plurality of cooling plates to dissipate heat generated by the power cell assembly in use thereof, an intermediate tray at least partially positioned in the casing, a plurality of power cells at least partially positioned in the intermediate tray, and a top cover that cooperates with the bottom tray, the casing, and the intermediate tray to at least partially enclose the plurality of power cells. The frame structure may include a pair of rails that each extends from a first end arranged forward of the pair of front wheels in the longitudinal direction to a second end arranged rearward of the pair of rear wheels in the longitudinal direction, the pair of rails may be spaced apart a first distance from one another in the location of the carrier, the pair of rails may be spaced apart a second distance from one another in a location forward of the carrier that is less than the first distance, and the pair of rails may be spaced apart a third distance from one another in a location rearward of the carrier that is less than the first distance and greater than the second distance.

According to another aspect of the present disclosure, a land vehicle may include a frame structure, a plurality of wheels supported by the frame structure, a plurality of electric motors to generate rotational power that are supported by the plurality of wheels, and a power cell assembly to supply electrical power to the plurality of motors that is supported by the frame structure. The frame structure may include a front cage that at least partially defines an operator cabin and a rear compartment positioned rearward of the front cage in a longitudinal direction. The plurality of wheels may include a pair of front wheels and a pair of rear wheels positioned rearward of the pair of front wheels in the longitudinal direction. Each of the plurality of electric motors may be integrated directly into one of the plurality of wheels. The power cell assembly may be at least partially housed by a carrier positioned between the pair of front wheels and the pair of rear wheels in the longitudinal direction. The frame structure may include a pair of rails that each extends from a first end arranged forward of the pair of front wheels in the longitudinal direction to a second end arranged rearward of the pair of rear wheels in the longitudinal direction. The pair of rails may be spaced apart a first distance from one another in the location of the carrier. The pair of rails may be spaced apart a second distance from one another in a location forward of the carrier that is less than the first distance. The pair of rails may be spaced apart a third distance from one another in a location rearward of the carrier that is less than the first distance and greater than the second distance.

In some embodiments, the operator cabin may include a steering wheel, an operator seat, and a rack arranged in the operator cabin opposite the steering wheel and the operator seat that includes a plurality of trays. The operator cabin may include a pair of tracks affixed to a floor of the operator cabin and spaced apart from one another in the longitudinal direction, and the rack may be movable along the pair of tracks in a lateral direction perpendicular to the longitudinal direction between a stowed position, in which the rack is disposed distant from the operator seat, and a delivery position, in which the rack is disposed close to the operator seat.

In some embodiments, each of the plurality of electric motors may be coupled to one of the plurality of wheels without any transmission gearing interposed therebetween. The plurality of electric motors may include a first electric motor integrated directly into one of the pair of front wheels, a second electric motor integrated directly into the other of the pair of front wheels, a third electric motor integrated directly into one of the pair of rear wheels, and a fourth electric motor integrated directly into the other of the pair of rear wheels.

In some embodiments, the power cell assembly may include a bottom tray, a casing supported by the bottom tray that houses a plurality of cooling plates to dissipate heat generated by the power cell assembly in use thereof, an intermediate tray at least partially positioned in the casing, a plurality of power cells at least partially positioned in the intermediate tray, and a top cover that cooperates with the bottom tray, the casing, and the intermediate tray to at least partially enclose the plurality of power cells. The land vehicle may include a second power cell assembly to supply electrical power to the plurality of electric motors that is supported by the frame structure, and the second power cell assembly may be at least partially housed by a second carrier that extends from a first end arranged forward of the pair of rear wheels in the longitudinal direction to a second end arranged rearward of the pair of rear wheels in the longitudinal direction.

According to yet another aspect of the present disclosure, a method of operating a land vehicle that includes a frame structure having a front cage that at least partially defines an operator cabin and a rear compartment positioned rearward of the front cage in a longitudinal direction, a plurality of wheels supported by the frame structure, and a plurality of electric motors each integrated directly into one of the plurality of wheels may include operating the plurality of electric motors independently of one another to drive rotation of the plurality of wheels independently of one another and steering the plurality of wheels to adjust an orientation of the land vehicle.

In some embodiments, steering the plurality of wheels to adjust an orientation of the land vehicle may include turning the land vehicle 360 degrees in a circular path. Turning the land vehicle 360 degrees in a circular path may include turning the land vehicle without shifting the land vehicle to a reverse operating range.

According to yet another aspect of the present disclosure still, a land vehicle may include a frame structure, a plurality of wheels supported by the frame structure, and a brake system coupled to each one of the plurality of wheels. The frame structure may include a front cage that at least partially defines an operator cabin and a rear compartment positioned rearward of the front cage in a longitudinal direction. Each of the plurality of wheels may be sized to permit direct integration of an electric motor therein. The brake system may include a disc having a plurality of notches defined between circumferentially adjacent teeth of the disc, a first braking device configured to contact an outer face of the disc to resist rotation of one of the plurality of wheels, a second braking device that is circumferentially spaced from the first braking device about the disc and configured to contact the outer face of the disc to resist rotation of the one of the plurality of wheels, and a third braking device configured to contact one or more teeth of the disc to resist rotation of the one of the plurality of wheels.

In some embodiments, the first braking device may include only one caliper and a plurality of pistons at least partially housed by the only one caliper. The plurality of pistons may include six pistons.

In some embodiments, the first braking device may include only one caliper and a single piston at least partially housed by the only one caliper.

In some embodiments, the second braking device may be an electronic parking brake mechanism. The third braking device may be a parking pawl mechanism operated independently from the electronic parking brake mechanism. The parking pawl mechanism may include a receptacle sized to receive a drive to permit manual release of the parking pawl mechanism in use of the land vehicle.

In some embodiments, the operator may include a steering wheel, an operator seat, and a rack arranged in the operator cabin opposite the steering wheel and the operator seat that includes a plurality of trays. The operator cabin may include a pair of tracks affixed to a floor of the operator cabin and spaced apart from one another in the longitudinal direction, and the rack may be movable along the pair of tracks in a lateral direction perpendicular to the longitudinal direction between a stowed position, in which the rack is disposed distant from the operator seat, and a delivery position, in which the rack is disposed close to the operator seat. The land vehicle may have a gross vehicular weight rating (GVWR) of between 10,001 pounds and 14,000 pounds.

In some embodiments, the land vehicle may include a plurality of electric motors, and each of the plurality of electric motors may be integrated directly into one of the plurality of wheels. Each of the plurality of electric motors may be coupled to one of the plurality of wheels without any transmission gearing interposed therebetween, and the land vehicle may not include an internal combustion engine.

According to a further aspect of the present disclosure, a land vehicle may include a frame structure, a plurality of wheels supported by the frame structure, and a brake system coupled to each one of the plurality of wheels. The frame structure may include a front cage that at least partially defines an operator cabin and a rear compartment positioned rearward of the front cage in a longitudinal direction. The brake system may include a disc having a plurality of notches defined between circumferentially adjacent teeth of the disc, a first braking device configured to contact an outer face of the disc to resist rotation of one of the plurality of wheels, and a second braking device configured to contact one or more teeth of the disc to resist rotation of the one of the plurality of wheels.

In some embodiments, the first braking device may be an electronic parking brake mechanism. The second braking device may be a parking pawl mechanism operated independently from the electronic parking brake mechanism. The land vehicle may include a third braking device circumferentially spaced from the first braking device about the disc that is configured to contact the outer face of the disc to resist rotation of the one of the plurality of wheels, and the third braking device may include only one caliper and at least one piston at least partially housed by the only one caliper.

In some embodiments, the operator cabin may include a steering wheel, an operator seat, and a rack arranged in the operator cabin opposite the steering wheel and the operator seat that includes a plurality of trays. The operator cabin may include a pair of tracks affixed to a floor of the operator cabin and spaced apart from one another in the longitudinal direction, and the rack may be movable along the pair of tracks in a lateral direction perpendicular to the longitudinal direction between a stowed position, in which the rack is disposed distant from the operator seat, and a delivery position, in which the rack is disposed close to the operator seat. The land vehicle may have a gross vehicular weight rating (GVWR) of between 10,001 pounds and 14,000 pounds. The land vehicle may include a plurality of electric motors, each of the plurality of electric motors may be integrated directly into one of the plurality of wheels, each of the plurality of electric motors may be coupled to one of the plurality of wheels without any transmission gearing interposed therebetween, and the land vehicle may not include an internal combustion engine.

According to a further aspect of the present disclosure, a method of operating a land vehicle that includes a frame structure having a front cage that at least partially defines an operator cabin and a rear compartment positioned rearward of the front cage in a longitudinal direction, a plurality of wheels supported by the frame structure, and a brake system coupled to each one of the plurality of wheels may include operating the land vehicle in a park operating range and operating the brake systems when the land vehicle is in the park operating range. Operating the brake systems when the land vehicle is in the park operating range may include selectively activating an electronic parking brake mechanisms of each brake system and selectively activating a parking pawl mechanisms of each brake system.

In some embodiments, operating the brake systems when the land vehicle is in the park operating range may include activating the parking brake mechanism of each brake system and the parking pawl mechanism of each brake system contemporaneously. Additionally, in some embodiments, the method may include selectively releasing the parking pawl mechanism of each brake system manually subsequent to activation of the parking pawl mechanism of each brake system.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 11 is a side perspective view of at least one brake assembly coupled to a wheel according to one embodiment of the present disclosure;

FIG. 12 is a detail view of a first braking device that may be included in the at least one brake assembly of FIG. 11;

DETAILED DESCRIPTION OF ILLUSTRATIVE EMBODIMENTS

Figure 1:
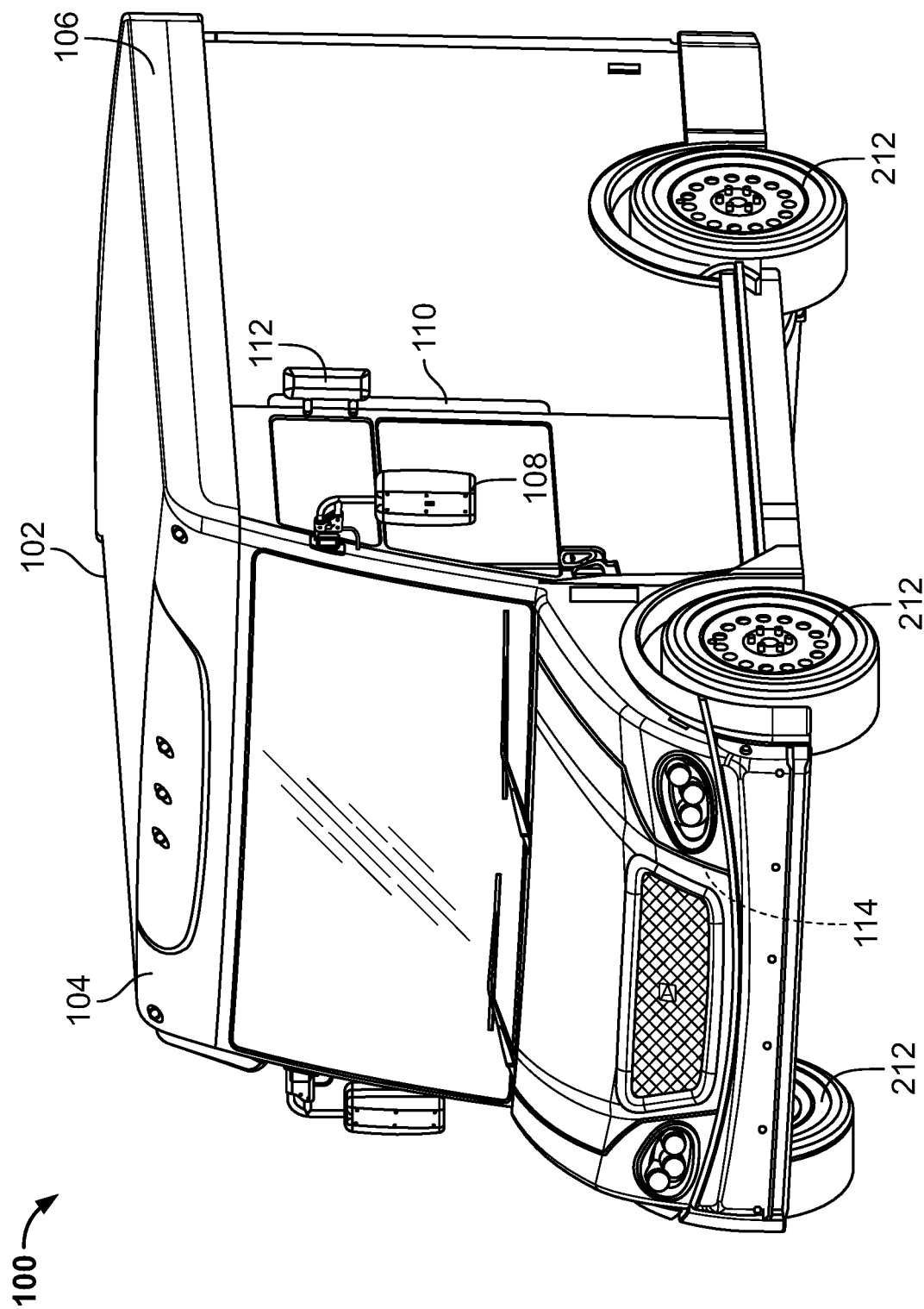
FIG. 1 is a front perspective view of an electric vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative land vehicle 100 is embodied as, or otherwise includes, an electric delivery vehicle 102, such as an electric delivery truck adapted for any use as a delivery vehicle, for example. In some embodiments, the electric delivery vehicle 102 is adapted for use as a mail delivery vehicle that may be employed by the United States Postal Service. Of course, in other embodiments, the electric delivery vehicle 102 may be configured for use in a variety of other suitable applications. Furthermore, in other embodiments, the land vehicle 100 may be embodied as, or otherwise include, an electric utility van.

In some embodiments, the illustrative electric delivery vehicle 102 is a postal delivery truck. Additionally, in some embodiments, the illustrative delivery vehicle 102 is a non-postal delivery truck. In embodiments in which the delivery vehicle 102 is a non-postal delivery truck, the vehicle 102 may be employed in a variety of applications, such as the applications mentioned below, for example.

The illustrative land vehicle 100 may include one or more of the features of the electric vehicle described in co-pending U.S. patent application Ser. No. 17/546,555, such as a roof cap 104, one or more rain gutter(s) 106, one or more blind spot camera system(s) 108, one or more opera window(s) 110, and one or more opera window mirror(s) 112, just to name a few. Additionally, the illustrative land vehicle 100 may include one or more features of the electric vehicle described in co-pending U.S. patent application Ser. No. 17/546,641, such as an impact management system 114, for example. The disclosures of those applications are incorporated herein by reference in their entireties.

In some embodiments, the illustrative land vehicle 100 may include a monocoque, such as one of the monocoques described in U.S. patent application Ser. No. 17/142,766. Furthermore, in some embodiments, a monocoque of the illustrative land vehicle 100 may be formed using a modular mold system, such as one of the modular mold systems described in U.S. patent application Ser. No. 17/142,766. Further still, in some embodiments, a monocoque of the illustrative land vehicle 100 may be formed according to the methods described in U.S. patent application Ser. No. 17/142,785. The disclosures of those applications are incorporated herein by reference in their entireties.

It should be appreciated that the land vehicle 100 may be employed in a variety of applications. In some embodiments, the land vehicle 100 may be embodied as, or otherwise included in, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, the vehicle 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

The illustrative land vehicle 100 includes a frame structure 200 (see FIG. 2) and wheels 212 supported by the frame structure 200. The frame structure 200 includes, or otherwise at least partially defines, a front cage 204 that at least partially defines an operator cabin 206 and a rear compartment 208 positioned rearward of the front cage 204 in a longitudinal direction 210. The wheels 212 includes a pair of front wheels 214, 216 and a pair of wheels 218, 220 positioned rearward of the wheels 214, 216 in the longitudinal direction 210. As will be evident from the discussion that follows, each of the wheels 212 is sized to permit direct integration of an electric motor 800 therein. However, as mentioned above, in other embodiments, the land vehicle 100 may include a monocoque. In one example, the monocoque may be provided in place of the frame structure 200. In another example, the monocoque may be provided in addition to the frame structure 200. In yet another example, the frame structure 200 may serve as an reinforcement structure which is disposed internally in the monocoque, and the monocoque may be disposed externally to the frame structure 200.

In the illustrative embodiment, the land vehicle 100 includes electric motors 800 (see FIG. 8) supported by the wheels 212 that are configured to generate rotational power in use of the vehicle 100. More specifically, the illustrative vehicle 100 includes an electric motor 802 integrated directly into the wheel 214, an electric motor 804 integrated directly into the wheel 216, an electric motor 806 integrated directly into the wheel 218, and an electric motor 808 integrated directly into the wheel 220. As discussed below, each of the motors 802, 804, 806, 808 is illustratively embodied as, or otherwise includes, a hub motor or wheel hub motor.

Figure 2:
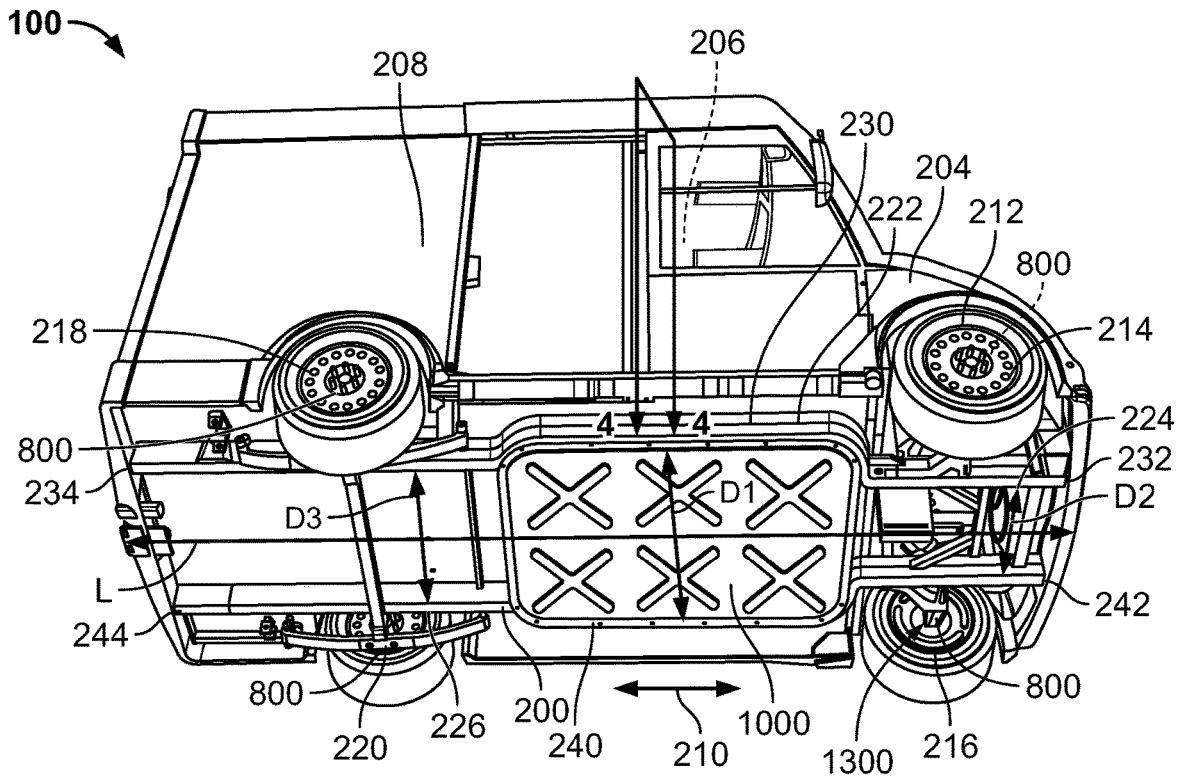
FIG. 2 is a bottom perspective view of the electric vehicle of FIG. 1 according to one embodiment of the present disclosure.
Figure 3:
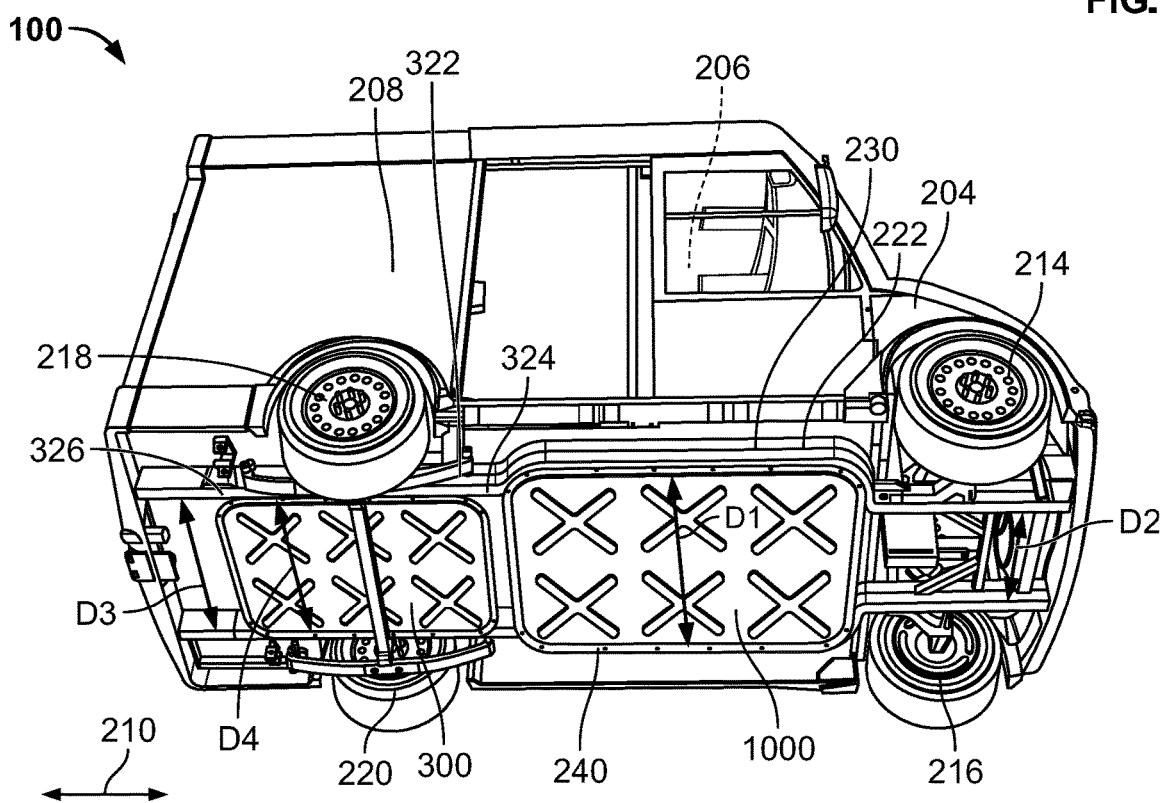
FIG. 3 is a bottom perspective view of the electric vehicle of FIG. 1 according to another embodiment of the present disclosure.

The illustrative land vehicle 100 includes a power cell assembly 1000 (see FIG. 10) supported by the frame structure 200 that is configured to supply electrical power to the electric motors 800 in use of the vehicle 100. As best seen in FIGS. 2 and 3, the power cell assembly 1000 is at least partially housed by a carrier 222 included in, or otherwise defined by, the frame structure 200. In the illustrative embodiment, the carrier 222 is positioned between the front wheels 214, 216 and the rear wheels 218, 220 in the longitudinal direction 210. In some embodiments, positioning of the power cell assembly 1000 approximately midway between the front wheels 214, 216 and the rear wheels 218, 220 in the direction 210 may facilitate routing of electrical power to, and distribution of electrical power between, the electric motors 800 integrated directly into the wheels 212.

The illustrative land vehicle 100 includes a brake system 1300 (see FIG. 13) coupled to each one of the wheels 212. In some embodiments, the brake system 1300 includes a disc 1302, a braking device 1310, a braking device 1330, and a braking device 1350. The illustrative disc 1302 includes notches 1304 defined between circumferentially adjacent teeth 1306 of the disc 1302. The illustrative braking device 1310 is configured to contact an outer face 1308 of the disc 1302 to resist rotation of one of the wheels 212 in use of the vehicle 100. The illustrative braking device 1330 is circumferentially spaced from the braking device 1310 about the disc 1302 and configured to contact the outer face 1308 thereof to resist rotation of one of the wheels 212 in use of the vehicle 100. The illustrative braking device 1350 is configured to contact one or more teeth 1306 of the disc 1302 to resist rotation of one of the wheels 212 in use of the vehicle 100.

Referring now to FIG. 2, the illustrative frame structure 200 includes a pair of substantially identical rails 230, 240 arranged to extend in the longitudinal direction 210 substantially over an entire length L of the vehicle 100. The rail 230 extends from an end 232 arranged forward of the wheels 214, 216 in the longitudinal direction 210 to an opposite end 234 arranged rearward of the wheels 218, 220 in the direction 210. The rail 240 extends from an end 242 arranged forward of the wheels 214, 216 in the direction 210 to an opposite end 244 arranged rearward of the wheels 218, 220 in the direction 210.

Figure 8:
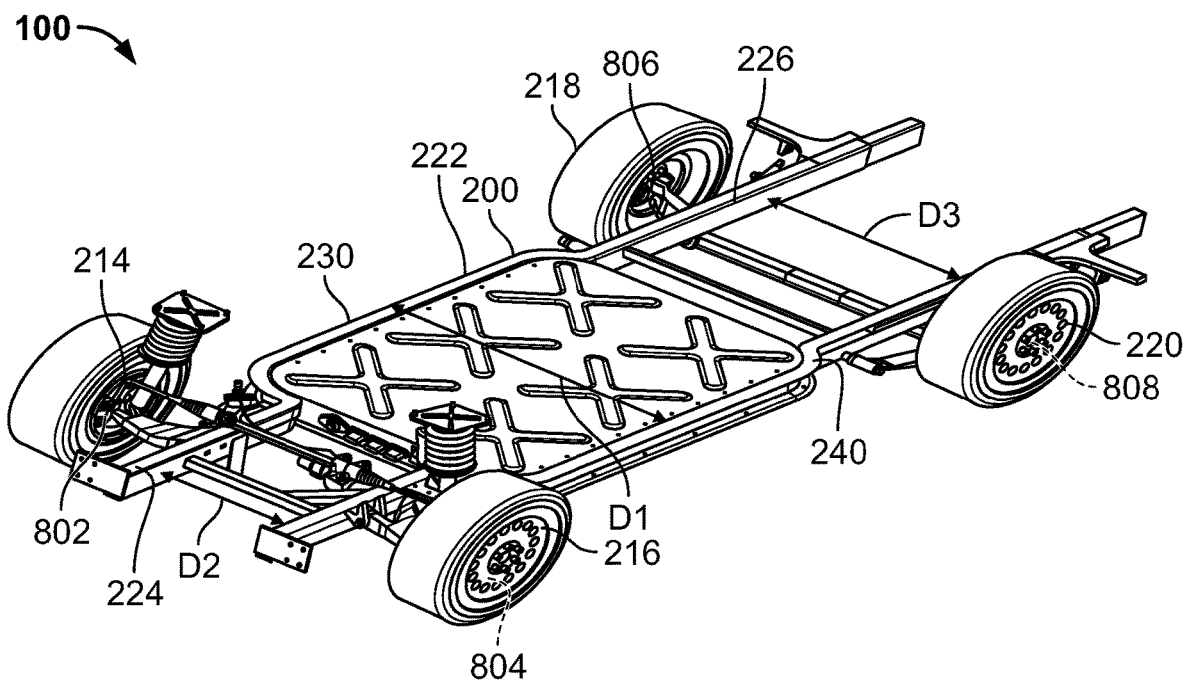
FIG. 8 is a front perspective view of the electric vehicle of FIG. 1 showing a plurality of electric motors supported by the frame structure with certain features omitted for the sake of simplicity.

In the illustrative embodiment, as shown in FIGS. 2 and 8, the rails 230, 240 are laterally spaced apart from one another by a distance D1 in the location of the carrier 222. In a location 224 forward of the carrier 222 in the direction 210, the rails 230, 240 are laterally spaced apart from one another by a distance D2. In a location 226 rearward of the carrier 222 in the direction 210, the rails 230, 240 are laterally spaced apart from one another by a distance D3.

The illustrative distance D1 is greater than the distance D2 and the distance D3. The illustrative distance D3 is greater than the distance D2.

Referring now to FIG. 3, in some embodiments, in addition to the power cell assembly 1000, the land vehicle 100 includes a power cell assembly 300. The power cell assembly 300 may be substantially identical to the power cell assembly 1000. Like the power cell assembly 1000, the illustrative power cell assembly 300 is supported by the frame structure 200 and configured to supply electrical power to the electric motors 800. In the illustrative embodiment, the power cell assembly 300 is at least partially housed by a carrier 322 of the frame structure 200. The carrier 322 is illustratively arranged rearward of the carrier 222 in the longitudinal direction 210. Additionally, the carrier 322 extends from an end 324 located forward of the wheels 218, 220 in the direction 210 to an opposite end 326 located rearward of the wheels 218, 220 in the direction 210.

In the illustrative embodiment, in the location of the carrier 322, the rails 230, 240 are laterally spaced apart from one another by a distance D4. The distance D4 is illustratively smaller than the distance D1. The distance D4 is illustratively greater than the distance D2 and the distance D3. In some embodiments, however, the distance D4 may be substantially equal to the distance D3.

Figure 4:
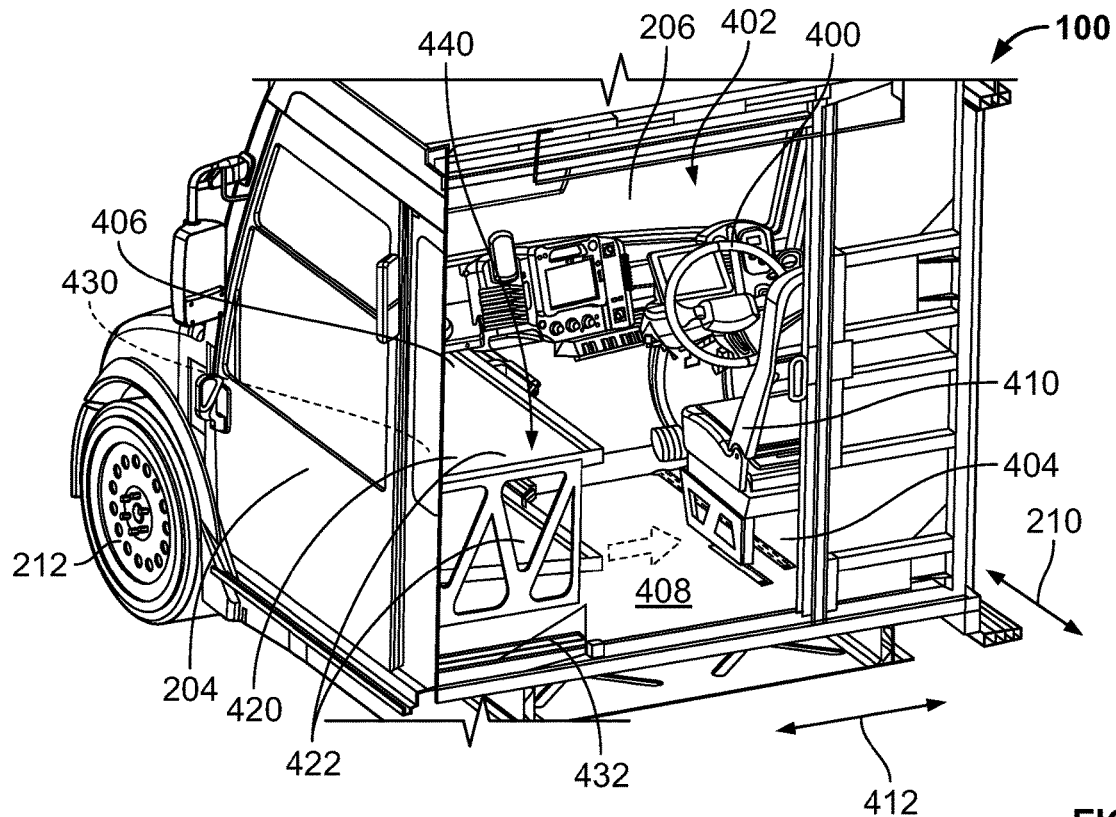
FIG. 4 is a sectional view of the electric vehicle of FIG. 1 taken about line 4-4 showing a rack in a stowed position in which the rack is disposed distant from an operator seat.
Figure 5:
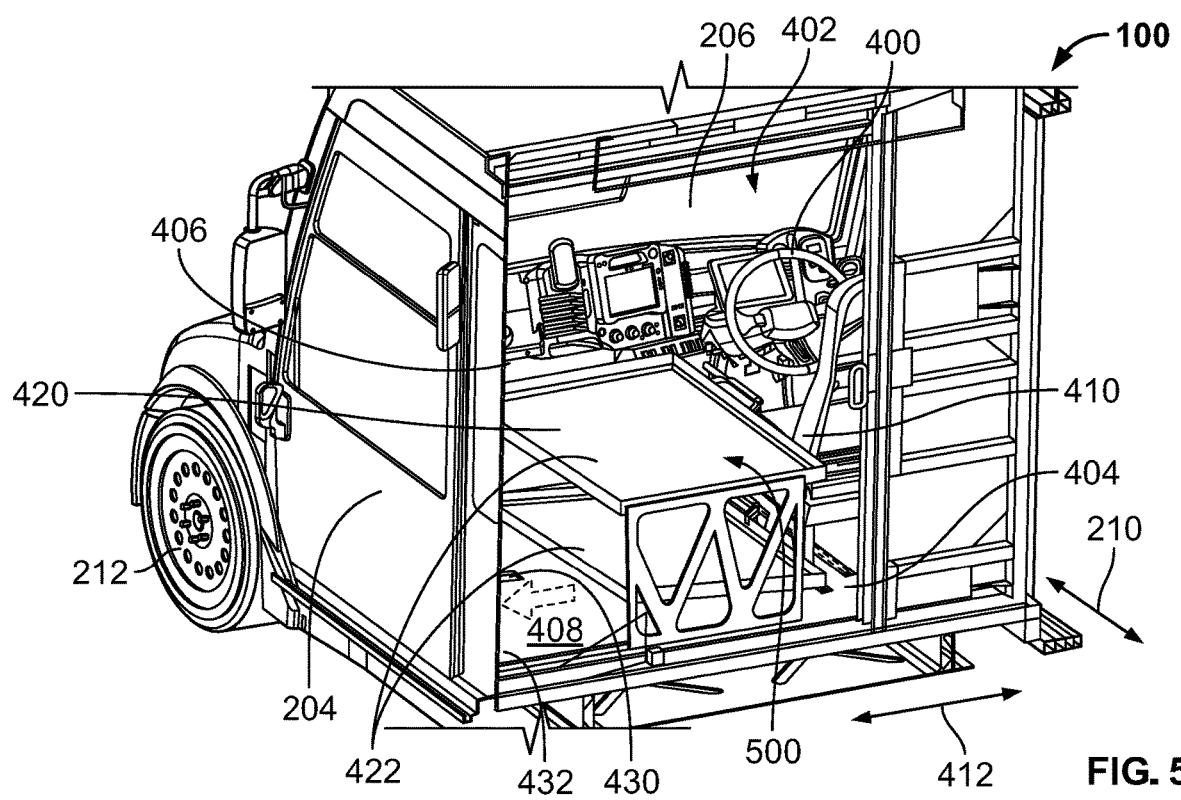
FIG. 5 is a sectional view similar to FIG. 4 showing the rack in a delivery position in which the rack is disposed close to the operator seat.

Referring now to FIGS. 4 and 5, in the illustrative embodiment, a number of features are included in the operator cabin 206 of the land vehicle 100. Those features are described in greater detail in co-pending U.S. application Ser. No. 17/546,555. Among other things, the illustrative operator cabin 206 includes, or otherwise houses, a steering wheel 400, an operator seat 410, and a rack 420 including trays 422.

The illustrative cabin 206 includes a right-hand drive configuration 402 in which the steering wheel 400 and the operator seat 410 are arranged on a right side 404 of the cabin 206. It should be appreciated that the configuration 402 may facilitate curbside delivery from a driver seated in the operator seat 410 to a curbside mailbox, at least in some embodiments. In any case, in the illustrative right-hand configuration 402 of the operator cabin 206, the rack 420 is mounted on a left side 406 of the cabin 206 opposite the steering wheel 400 and the operator seat 410. As such, the rack 420 occupies a space that might otherwise be occupied by a passenger or driver seat in other configurations.

The illustrative operator cabin 206 includes, or otherwise houses, a pair of tracks 430, 432 that are affixed to a floor 408 of the cabin 206. The tracks 430, 432 are spaced apart from one another in the longitudinal direction 210 and arranged on the left side 406 of the cabin 206. In the illustrative embodiment, the rack 420 is movable in the operator cabin 206 along the tracks 430, 432 in a lateral direction 412 perpendicular to the longitudinal direction 210.

In the illustrative embodiment, the rack 420 is movable in the operator cabin 206 along the tracks 430, 432 in a lateral direction 412 between a stowed position 440 and a delivery position 500. In the stowed position 440 of the rack 420, the rack 420 is disposed distant from the operator seat 410. It should be appreciated that when the rack 420 is disposed in the stowed position 440, items (e.g., mail parcels, articles, etc.) held by the trays 422 of the rack 420 may be located sufficiently far from the operator such that the operator may be required to leave the seat 410 to access the items. In the delivery position 500 of the rack 420, the rack 420 is disposed close to the operator seat 410. As a result, when the rack 420 is disposed in the delivery position 500, items held by the trays 422 of the rack 420 may be accessed by the operator without leaving the seat 410, at least in some embodiments.

It should be appreciated that in the United States, trucks are often classified according to their gross vehicular weight rating (GVWR) which may correspond to particular truck classifications and duty classifications given in Table 1 below. In some embodiments, the vehicle 100 has a GVWR (i.e., accounting for the weight of the truck when empty and the payload carrying capacity of the truck when full) of between 6,000 pounds and 19,800 pounds. Additionally, in some embodiments, the vehicle 100 has a GVWR of between 10,001 pounds and 14,000 pounds such that the vehicle 100 is embodied as, or otherwise includes, a Class 3 electric delivery truck. In one particular example, in some embodiments, the vehicle 100 has a 1000 cubic foot capacity and weighs roughly 6,500 pounds when empty and has a 6,000 pound payload capacity such that the vehicle 100 has a GVWR of about 12,500 pounds. Of course, it should be appreciated that in other embodiments, the vehicle 100 may be embodied as, or otherwise include, a Class 3 vehicle, a Class 4 vehicle, or a Class 5 vehicle.

TABLE 1

| US Truck Class | Duty Classification | Weight Limit |
| --- | --- | --- |
| Class 1 | Light Truck | 0-6,000 Pounds |
| Class 2a | Light Truck | 6,001-8,500 Pounds |
| Class 2b | Light/Medium Truck | 8,501-10,000 Pounds |
| Class 3 | Medium Truck | 10,001-14,000 Pounds |
| Class 4 | Medium Truck | 14,001-16,000 Pounds |
| Class 5 | Medium Truck | 16,001-19,500 Pounds |
| Class 6 | Medium Truck | 19,501-26,000 Pounds |
| Class 7 | Heavy Truck | 26,001-33,000 Pounds |
| Class 8 | Heavy Truck | 33,001 Pounds + |

It should be appreciated that in some embodiments, the illustrative cabin 206 may include a left-hand drive configuration in which the steering wheel 400 and the operator seat 410 are arranged on the left side 406 of the cabin 206. In such a left-hand drive configuration, the rack 420 may be mounted on the right side 404 of the cabin 206 opposite the steering wheel 400 and the operator seat 410. As such, the rack 420 may occupy a space that might otherwise be occupied by a passenger or driver seat in other configurations. Furthermore, in such a left-hand drive configuration, the tracks 430, 432 may be arranged on the right side 404 of the cabin 206.

In some embodiments, the vehicle 100 is embodied as, or otherwise includes, any one of a Class 3 through Class 5 electric delivery truck having a right-hand drive configuration. Additionally, in some embodiments, the vehicle 100 is embodied as, or otherwise includes, any one of a Class 3 through Class 5 electric delivery truck having a left-hand drive configuration. Further, in some embodiments still, the vehicle 100 is embodied as, or otherwise includes, any one of a Class 3 through Class 5 electric delivery truck having another suitable drive configuration, such as a configuration in which the steering wheel 400 and the operator seat 410 are centrally located in the cabin 206 in the lateral direction 412, for example.

Figure 6:
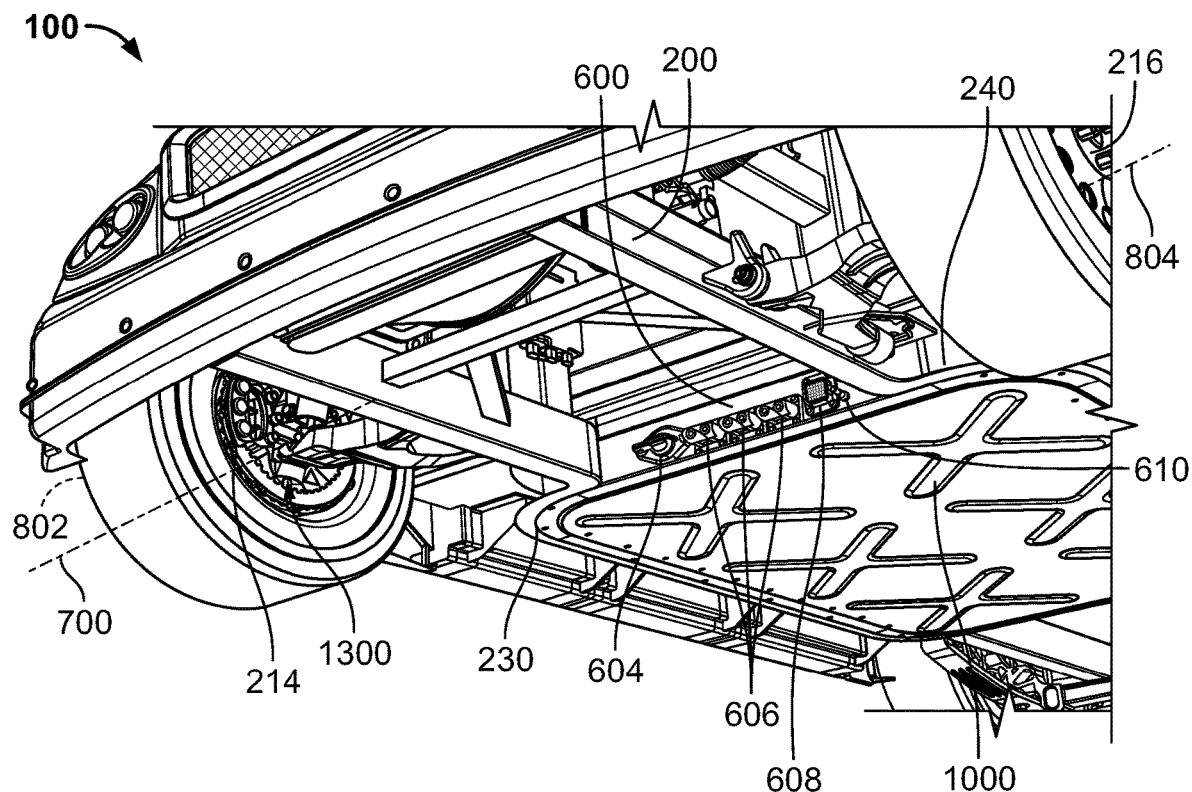
FIG. 6 is a bottom perspective view of the electric vehicle of FIG. 1 showing a power cell assembly supported by a frame structure.

Referring now to FIG. 6, the illustrative power cell assembly 1000 includes a connection panel 600. The connection panel 600 is illustratively arranged at, and accessible from, a forward-most point 602 of the power cell assembly 1000. Such positioning may facilitate coupling between the electric motors 802, 804 integrated into the respective wheels 214, 216 and the power cell assembly 1000 via the connection panel 600, among other things.

In the illustrative embodiment, the connection panel 600 includes a master disconnect switch 604, quick disconnects 606, a connector 608, and quick disconnects 610. The master disconnect switch 604 is configured to selectively disconnect the power cell assembly 1000 from one or more loads (e.g., the motors 800) or accessories to prevent electrical power from being supplied to the one or more loads or accessories. The quick disconnects 606 are each configured to enable electrical signal transmission at high-voltage ratings between components of the vehicle 100 (e.g., between the power cell assembly 1000 and the motors 800 and/or between the power cell assembly 1000 and a high voltage junction box). In the illustrative embodiment, the connection panel 600 includes three quick disconnects 606, although it should be appreciated that the connection panel 600 may include another suitable number of quick disconnects 606 in other embodiments. The connector 608 is configured to enable electrical signal transmission at low-voltage ratings between components of the vehicle 100 (e.g., between the power cell assembly 1000 and other low-voltage components). The quick disconnects 610 are configured for connection to one or more fluid hoses to permit delivery of cooling fluid from a fluid source to the power cell assembly 1000 in use of the vehicle 100.

Figure 7:
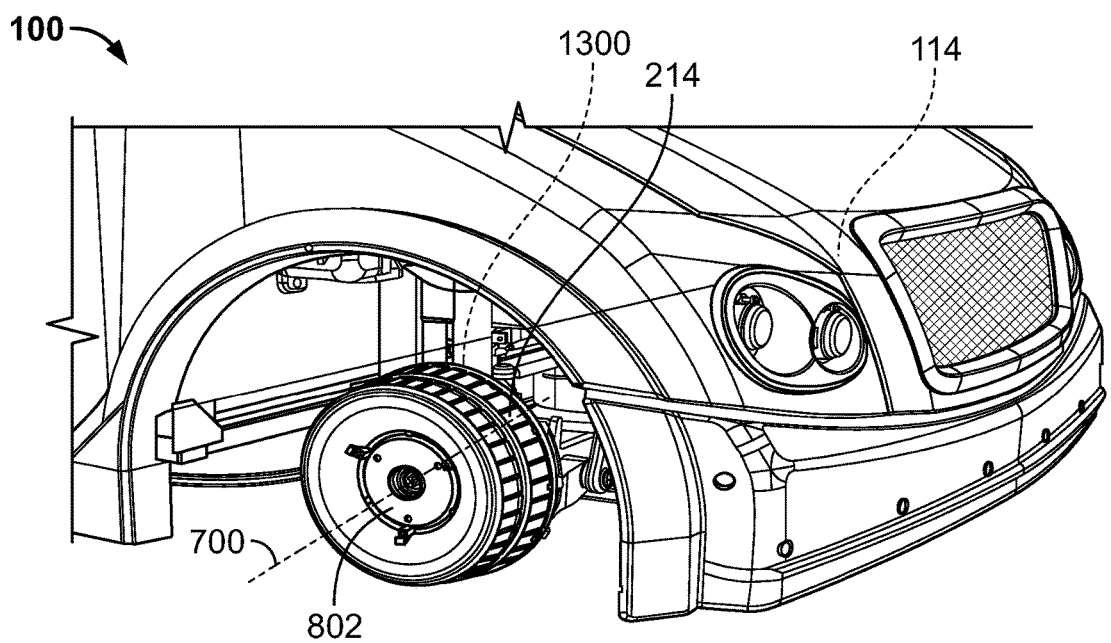
FIG. 7 is a side perspective view of the electric vehicle of FIG. 1 showing an electric motor integrated directly into a wheel.

Referring now to FIG. 7, one of the electric motors 800 (i.e., the motor 802) is shown in greater detail. The illustrative motor 802 is embodied as, or otherwise includes, any device that is capable of being driven by electrical energy supplied by the power cell assembly 1000 to produce rotational power. As indicated above, the illustrative motor 802 is directly integrated into the wheel 214 so that rotational power produced by the motor 802 is provided directly to the wheel 214 in use of the vehicle 100. At least in some embodiments, the motor 802 is directly integrated into the wheel 214 such that the motor 802 and the wheel 214 are concentrically mounted about an axis 700. In such embodiments, the axis 700 may define, or otherwise coincide with, a rotational axis of the wheel 214.

In the illustrative embodiment, each of the electric motors 800 is coupled to one of the wheels 212 without any transmission gearing interposed therebetween. Even more, at least in some embodiments, the illustrative land vehicle 100 entirely omits one or more transmissions. Consequently, in such embodiments, the land vehicle 100 is free from components that may be present in conventional transmissions, such as torque converters, rotating torque-transmitting mechanisms or clutches, stationary torque-transmitting mechanisms or brakes, transmission gearing, pressure control valves, shift control valves, regulator valves, check valves, and various components of electro-hydraulic control systems. As a result, the powertrain and/or drivetrain of the vehicle 100 may include significantly fewer parts than other configurations, thereby facilitating maintenance, reliability, and reduced design complexity, among other things.

In the illustrative embodiment, the electric motors 800 of the land vehicle 100 are the only components of the vehicle 100 capable of generating rotational power to drive the wheels 212. The illustrative land vehicle 100 therefore does not include an internal combustion engine. As such, the land vehicle 100 is free from a number of components that may be utilized in conventional configurations to transmit rotational power from one or more internal combustion engines to one or more wheels, such as driveshafts, differentials, and axles, just to name a few. In that additional respect, the powertrain and/or drivetrain of the vehicle 100 may include significantly fewer parts than other configurations, which may facilitate maintenance, reliability, and reduced design complexity as mentioned above.

Referring now to FIG. 8, the wheels 214, 216, 218, 220 with the respective electric motors 802, 804, 806, 808 integrated directly therein are shown mounted to, and supported by, the frame structure 200. The power cell assembly 1000 is shown mounted to the carrier 222 so that the power cell assembly 1000 is supported by the frame structure 200. Certain elements (e.g., a body and a roof at least partially defining the front cage 204 and the rear compartment 208) of the land vehicle 100 are omitted for the sake of simplicity.

In the illustrative embodiment, each of the electric motors 802, 804, 806, 808 is configured to generate about 100 horsepower (hp) in use of the land vehicle 100. In some embodiments, each of the motors 802, 804, 806, 808 may be embodied as, or otherwise include, a brushed DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. Of course, it should be appreciated that in other embodiments, each of the motors 802, 804, 806, 808 may be embodied as, or otherwise include, another suitable device capable of converting electrical energy supplied by the power cell assembly 1000 to rotational power to drive the wheels 212. In some embodiments, each of the electric motors 802, 804, 806, 808 is configured to generate a sufficient amount of rotational power and/or motive force to drive movement of one or more of the wheels 212 over an estimated service life of the vehicle 100, which may encompass a significant number of missions and/or delivery trips. In such embodiments, each of the motors 802, 804, 806, 808 may be configured to generate less than 100 horsepower in use of the vehicle 100 or greater than 100 horsepower in use of the vehicle 100, whatever the case may be.

The illustrative power cell assembly 1000 includes one or more power cells 1050 (see FIG. 10) capable of supplying electrical power to the electric motors 802, 804, 806, 808 in use of the land vehicle 100. In the illustrative embodiment, the power cell(s) 1050 are configured to supply electrical power to the motors 800 at a rate of about 80 kilowatt-hour (kWh). In some embodiments, each of the one or more power cells 1050 may be embodied as, or otherwise include, a deep-cycle rechargeable battery. Additionally, in some embodiments, each of the one or more power cells 1050 may be embodied as, or otherwise include, a lithium-ion battery or lithium-polymer battery. In some embodiments still, each of the one or more power cells 1050 may be embodied as, or otherwise include, a lead-acid battery, a nickel-cadmium battery, a nickel-metal hydride battery, a zinc-air battery, or a sodium nickel chloride battery. However, in other embodiments, each of the power cell(s) 1050 may be embodied as, or otherwise include, another suitable device capable of supplying electrical power to the motors 800 to drive the wheels 212. In some embodiments, each of the one or more power cells 1050 is configured to supply electrical power to the electric motors 802, 804, 806, 808 at a sufficient rate to drive movement of one or more of the wheels 212 over an estimated service life of the vehicle 100, which may encompass a significant number of delivery missions and/or delivery trips. In such embodiments, each of the one or more power cells 1050 may be configured to supply electrical power to the motors 802, 804, 806, 808 at a rate less than 80 kWh in use of the vehicle 100 or greater than 80 kWh in use of the vehicle 100, whatever the case may be.

Figure 9:
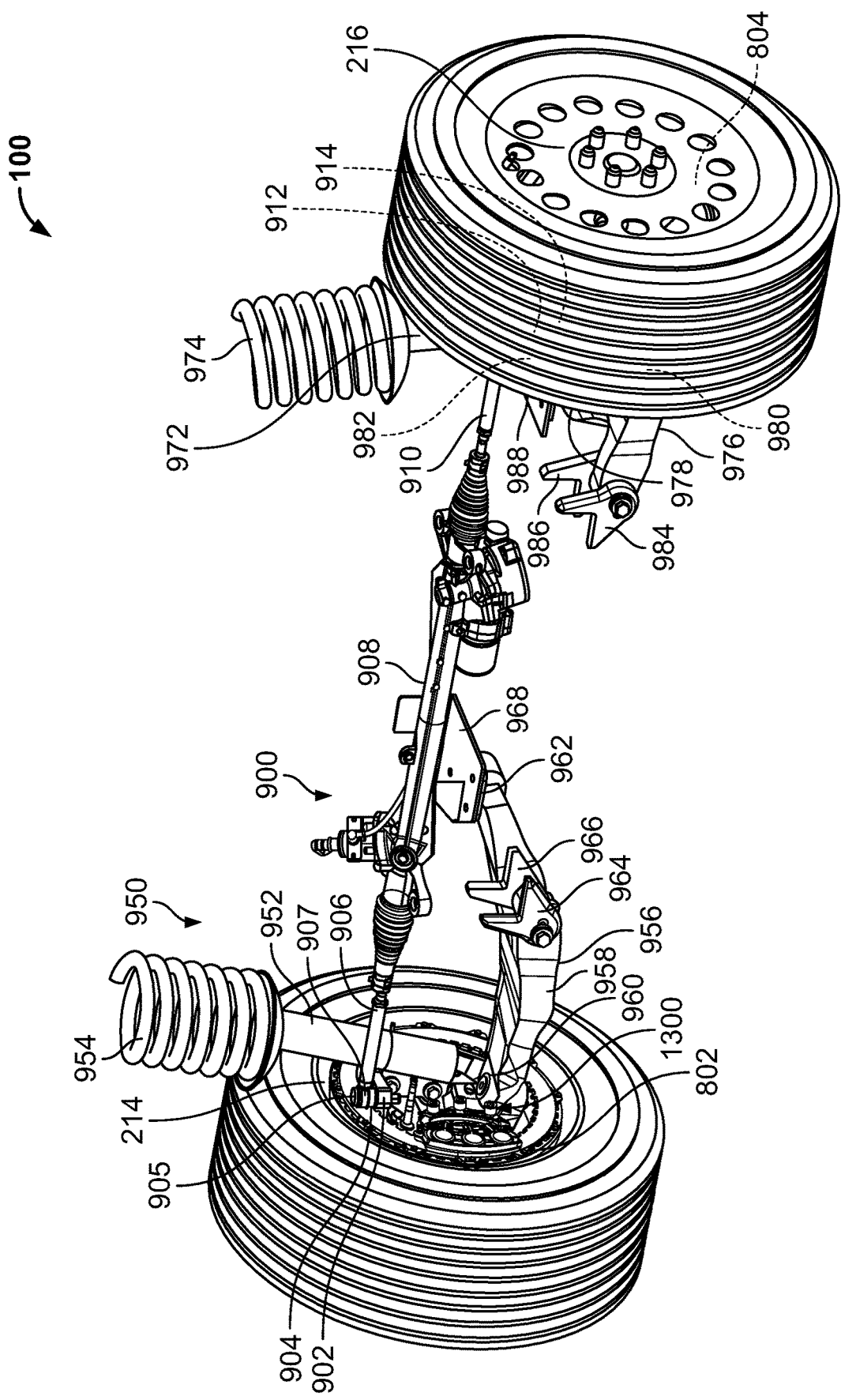
FIG. 9 is a detail view of a portion of the electric vehicle of FIG. 8 with certain features omitted for the sake of simplicity.

Referring now to FIG. 9, the front wheels 214, 216 with the respective electric motors 802, 804 integrated directly therein are depicted without a number of the features (e.g., the frame structure 200, the power cell assembly 1000, the rear wheels 218, 220, and the electric motors 806, 808) shown in FIG. 8. A number of components that may be included in a steering system 900 of the land vehicle 100 are shown in FIG. 9. Additionally, a number of components that may be included in a suspension system 950 of the land vehicle 100 are shown in FIG. 9.

The illustrative steering system 900 of the land vehicle 100 is configured to steer the wheels 214, 216 based on electrical signals provided by a component (e.g., the controller 1602) of a control system 1600 (see FIG. 16) of the vehicle 100. In the illustrative embodiment, the steering system 900 includes a lever 902 coupled to the wheel 214, a pin 904 coupled to the lever 902, a tie rod 906 coupled to the pin 904, an electric steering rack 908 coupled to the tie rod 906, a tie rod 910 coupled to the electric steering rack 908, a pin 912 coupled to the tie rod 910, and a lever 914 coupled to the pin 912 and the wheel 216. Of course, it should be appreciated that in other embodiments, the steering system 900 may include additional and/or alternative components.

The illustrative lever 902 receives the pin 904 such that a head 905 of the pin 904 extends outwardly from, and is not surrounded by, the lever 902. The head 905 of the pin 904 is received by a circular loop 907 of the tie rod 906. The tie rods 906, 910 are coupled to the electric steering rack 908 opposite one another. A circular loop (not shown) of the tie rod 910 receives a head (not shown) of the pin 912. The lever 914 receives the pin 912 such that the head of the pin 912 extends outwardly from, and is not surrounded by, the lever 914.

In some embodiments, the electric steering rack 908 may include, or otherwise be coupled to, one or more devices capable of causing selective extension or retraction of part(s) of the steering rack 908 based on electrical signals provided by a component of the control system 1600. In one example, the steering rack 908 may include, or otherwise be coupled to, one or more electrically-powered actuators capable of driving steering of the wheels 214, 216 through the tie rods 906, 910, the pins 904, 912, and the levers 902, 914. Of course, to do so, it should be appreciated that length(s) of the one or more actuators may be varied based on the selective extension or retraction thereof. As such, it should be appreciated that the one or more actuators of the steering rack 908, the tie rods 906, 910, the pins 904, 912, and the levers 902, 914 may cooperate to steer the wheels 214, 216 jointly and substantially in concert with one another, at least in some embodiments.

Although not depicted in FIG. 9, it should be appreciated that the steering system 900 may include a set of components substantially identical to those discussed above to effect steering of the rear wheels 218, 220, at least in some embodiments. That is, the steering system 900 may include, among other things, levers, pins, tie rods, and an electric steering rack including one or more actuators that cooperatively drive steering of the wheels 218, 220. Of course, those components of the steering system 900 may cooperate to steer the wheels 218, 220 jointly and substantially in concert with another, at least in some embodiments. In some embodiments, under control by the control system 1600, the steering system 900 may steer the front wheels 214, 216 and the rear wheels 218, 220 independently of one another. In other embodiments, under control by the control system 1600, the steering system 900 may steer the front wheels 214, 216 and the rear wheels 218, 220 substantially in concert with one another.

The illustrative suspension system 950 is configured to couple the frame structure 200 to the wheels 212 to permit some degree of relative movement between the frame structure 200 and the wheels 212 in use of the land vehicle 100. It should be appreciated that in some instances, one or more components of the steering system 900 may contribute to, or otherwise permit, some degree of relative movement between the frame structure 200 and the wheels 212. In that sense, the steering system 900 and the suspension system 950 may cooperate to permit movement between the frame structure 200 and the wheels 212 in use of the vehicle 100, at least in some embodiments.

It should be apparent that only a portion of the illustrative suspension system 950 of the land vehicle 100 that is associated with the front wheels 214, 216 is depicted in FIG. 9. Although the rear wheels 218, 220 are not shown in the figure, the description of the suspension system 950 with respect to the front wheels 214, 216 is largely intended to apply to the rear wheels 218, 220. Regardless, in the illustrative embodiment, the suspension system 950 includes a strut 952 coupled to the wheel 214, a spring 954 at least partially surrounding the strut 952, an attachment structure 956 that couples the wheel 214 to the frame structure 200, a strut 972 coupled to the wheel 216, a spring 974 at least partially surrounding the strut 972, and an attachment structure 976 that couples the wheel 216 to the frame structure 200.

The illustrative strut 952 may be coupled to the wheel 214 at one end thereof and coupled to a stationary structure of the land vehicle 100 (e.g., a portion of the frame structure 200 or a body partially defining the front cage 204 and the rear compartment 208) at an opposite end thereof. In some embodiments, the strut 952 may be adapted to resist longitudinal compression in use of the vehicle 100. In other embodiments, however, the strut 952 may be placed in tension in use of the vehicle 100. In any case, the spring 954 receives the strut 952 such that the spring 954 may be positioned between the strut 952 and the stationary structure mentioned above. In some embodiments, the strut 952 and the spring 954 may cooperatively dampen forces applied at the wheel 214 in use of the vehicle 100 such that lower magnitude forces are reacted to the stationary structure and/or the frame structure 200 to improve ride quality and reduce vibration.

The illustrative attachment structure 956 includes an arm 958, grooved links 964, 966 pivotally coupled to the arm 958, and a mount bracket 968 affixed to the arm 958. The arm 958 is coupled to the wheel 214 at an end 960 thereof and to the mount bracket 968 at an opposite end 962 thereof. The illustrative arm 958 extends between the ends 960, 962 such that the arm 958 generally defines a J-shape. The grooved links 964, 966 each generally define a V-shape and are configured to contact and/or couple to the frame structure 200, at least in some embodiments. The mount bracket 968 is also configured to contact and/or couple to the frame structure 200. In some embodiments, the grooved links 964, 966 and the mount bracket 968 may interface with the rail 230 of the frame structure 200 at a location arranged forward of the carrier 222 in the longitudinal direction 210.

The illustrative strut 972 may be coupled to the wheel 216 at one end thereof and coupled to a stationary structure of the land vehicle 100 (e.g., a portion of the frame structure 200 or a body partially defining the front cage 204 and the rear compartment 208) at an opposite end thereof. In some embodiments, the strut 972 may be adapted to resist longitudinal compression in use of the vehicle 100. In other embodiments, however, the strut 972 may be placed in tension in use of the vehicle 100. In any case, the spring 974 receives the strut 972 such that the spring 974 may be positioned between the strut 972 and the stationary structure mentioned above. In some embodiments, the strut 972 and the spring 974 may cooperatively dampen forces applied at the wheel 216 in use of the vehicle 100 such that lower magnitude forces are reacted to the stationary structure and/or the frame structure 200 to improve ride quality and reduce vibration.

The illustrative attachment structure 976 includes an arm 978, grooved links 984, 986 pivotally coupled to the arm 978, and a mount bracket 988 affixed to the arm 978. The arm 978 is coupled to the wheel 216 at an end 980 thereof and to the mount bracket 988 at an opposite end 982 thereof. The illustrative arm 978 extends between the ends 980, 982 such that the arm 978 generally defines a J-shape. The grooved links 984, 986 each generally define a V-shape and are configured to contact and/or couple to the frame structure 200, at least in some embodiments. The mount bracket 988 is also configured to contact and/or couple to the frame structure 200. In some embodiments, the grooved links 984, 986 and the mount bracket 988 may interface with the rail 240 of the frame structure 200 at a location arranged forward of the carrier 222 in the longitudinal direction 210.

Of course, it should be appreciated that in some embodiments, the suspension system 950 may include additional and/or alternative components. For example, the suspension system 950 may include one or more shock absorbers, springs, linkages, axles, rods, dampers, torsion bars, beams, or the like. Furthermore, in some embodiments, it should be appreciated that the suspension system 950 may include a first set of components for the front wheels 214, 216 and a second set of components for the rear wheels 218, 220, and that the first and second sets of components may not be identical.

Figure 10:
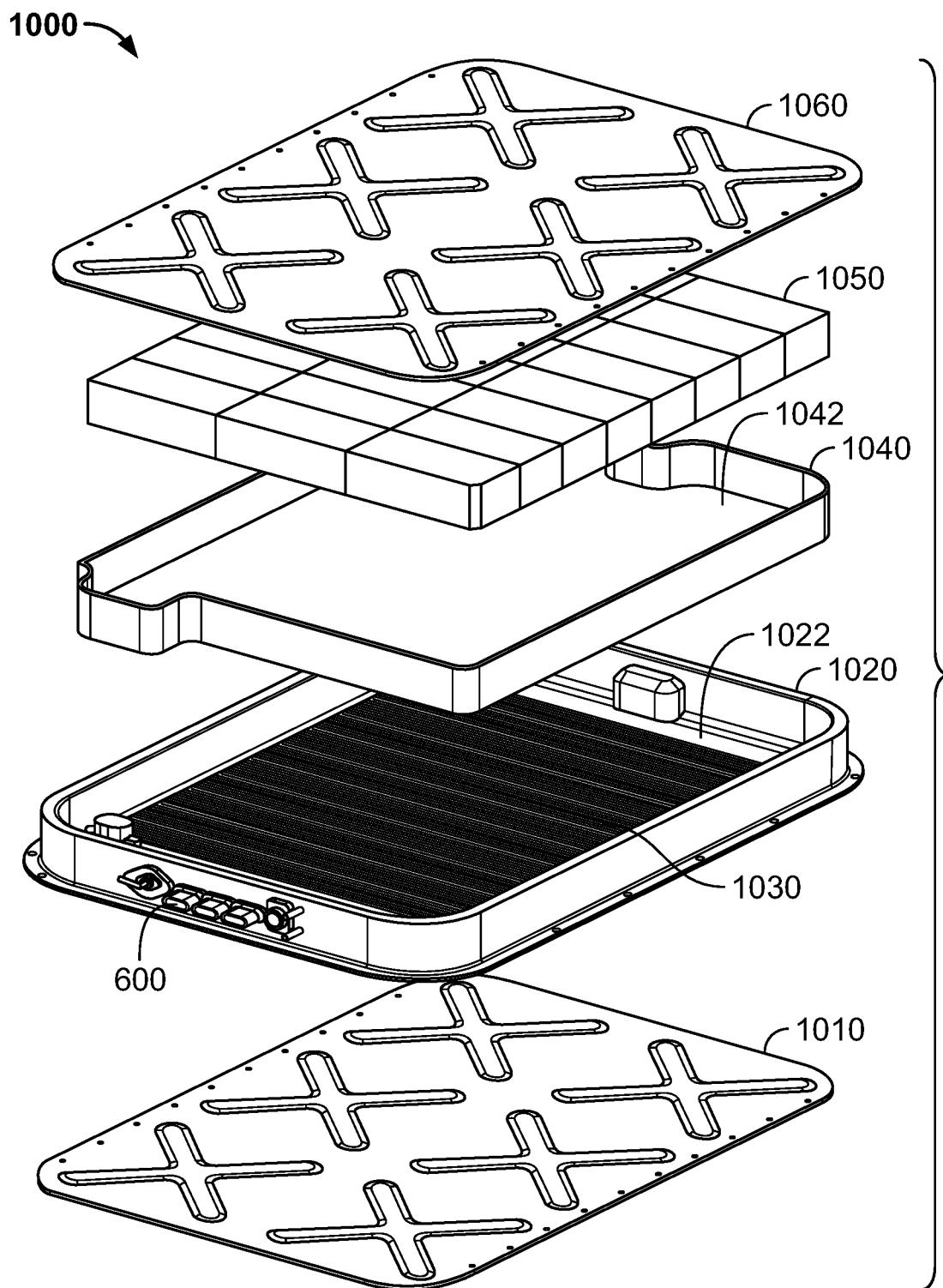
FIG. 10 is an exploded assembly view of at least one power cell assembly that may be included in the electric vehicle of FIG. 1.

Referring now to FIG. 10, the illustrative power cell assembly 1000 includes a bottom tray 1010, a casing 1020 supported by the bottom tray 1010, an intermediate tray 1040 at least partially positioned in the casing 1020, the power cells 1050, and a top cover 1060. When the power cell assembly 1000 is assembled and held by the carrier 222, the casing 1020, the intermediate tray 1040, and the power cells 1050 are arranged between the bottom tray 1010 and the top cover 1060. Additionally, when the power cell assembly 1000 is assembled and held by the carrier 222, the bottom tray 1010 defines the lowest point of the assembly 1000 (i.e., in a vertical direction) relative to a surface underlying the vehicle 100 and the top cover 1060 defines the highest point of the assembly 1000 relative to the surface.

In the illustrative embodiment, the casing 1020 is formed to include the connection panel 600. The illustrative casing 1020 houses cooling plates 1030 in an interior cavity 1022 thereof. Each of the cooling plates 1030 is embodied as, or otherwise includes, any device or collection of devices capable of dissipating heat generated by the power cells 1050 to cool the assembly 1000 in use of the vehicle 100. In some embodiments, each of the cooling plates 1030 may be embodied as, or otherwise include, a liquid cold plate or the like. Furthermore, in some embodiments, each of the cooling plates 1030 may be utilized in conjunction with one or more heat exchangers to transfer heat from heated liquid (i.e., liquid that receives heat from the power cells 1050) to a fluid medium (e.g., air). Further still, in some embodiments, one or more fans may be utilized in conjunction with the cooling plates 1030 and the one or more heat exchangers to effect heat transfer from the power cells 1050 to a fluid medium to cool the assembly in use of the vehicle 100.

In the illustrative embodiment, the power cells 1050 are at least partially positioned in an interior space 1042 defined by the intermediate tray 1040. When the power cell assembly 1000 is assembled, the power cells 1050 are at least partially positioned in the intermediate tray 1040 and the intermediate tray 1040 is at least partially positioned in the casing 1020. Accordingly, when the power cell assembly 1000 is assembled, the top cover 1060 cooperates with the bottom tray 1010, the casing 1020, and the intermediate tray 1040 to at least partially enclose the power cells 1050.

In some embodiments, each of the power cells 1050 may be included in a battery pack module (e.g., one of the battery pack modules 2010). Additionally, in some embodiments, the power cell assembly 1000 may include n battery pack modules, where n is an integer equal to or greater than one. It should be appreciated that a greater number of battery pack modules included in the power cell assembly 1000 provides increased power capacity during operation of the illustrative vehicle 100. Therefore, when the vehicle 100 requires additional power capacity to complete one or more extended routes, additional battery pack modules may provide sufficient power as the vehicle 100 travels the extended route(s). However, when the vehicle 100 completes one or more routes of decreased duration, the vehicle 100 may not require the power provided by the power capacity of the additional battery pack modules.

Often times, the vehicle 100 may execute delivery routes of different durations. For example, the vehicle 100 may execute delivery routes of increased duration during the holiday season as the amount of stops per delivery route is significantly increased due to the significant increase in packages that are required to be delivered during the holiday season. In such an example, the duration of the delivery routes executed by the vehicle 100 may be significantly increased in order for the increased amount of packages to be delivered in a timely manner. However, during other times of the year that are outside of the holiday season, the duration of the delivery routes executed by the vehicle 100 may be significantly decreased from the duration of the delivery routes executed during the holiday season due to a significant decrease in the amount of packages that are required to be delivered.

Delivery routes of increased duration require that the vehicle 100 have an increased power capacity in order for the vehicle 100 to have sufficient power to complete the delivery routes of increased duration. In doing so, the vehicle 100 may require that the power cell assembly 1000 include increased battery pack modules in order to have the increased power capacity such that the vehicle 100 has sufficient power to complete the delivery routes of increased duration. Although the increased battery pack modules increase the weight of the vehicle 100, increased weight may be necessary to have the power capacity to execute the routes of increased duration.

Rather than having different power cell assemblies with different quantities of battery pack modules to be used for the execution of different duration of routes, the power cell assembly 1000 may be modular such that different quantities of battery pack modules may be added or removed from the power cell assembly 1000 to customize the power capacity of the vehicle 100 to the duration of the route(s) expected to be executed. In doing so, battery pack modules may be added to the power cell assembly 1000 when the vehicle 100 is executing routes of increased duration. Conversely, battery pack modules may be removed from the power cell assembly 1000 when the vehicle 100 is executing routes of decreased duration to avoid unnecessarily increasing the weight of the vehicle 100. Further discussion of a modular system (e.g., the modular system 2000) including various quantities of battery pack modules (e.g., modules 2010) is provided below with reference to FIGS. 19 and 20.

Referring now to FIGS. 11 and 12, according to one embodiment of the present disclosure, the land vehicle 100 includes at least one brake assembly 1100. The brake assembly 1100 is illustratively coupled to one of the wheels 212. It should be appreciated that in some embodiments, the brake assembly 1100 is coupled to each one of the wheels 212 such that the land vehicle 100 includes a total of four brake assemblies 1100. In other embodiments, as described in greater detail below with reference to FIG. 13, the land vehicle 100 may include a brake system 1300 coupled to each one of the wheels 212 that includes multiple braking devices.

In the illustrative embodiment, the brake assembly 1100 includes a disc or rotor 1102 configured for rotation about a rotational axis 1104. The illustrative disc 1102 is coupled to the wheel 212 for common rotation therewith about the axis 1104, at least in some embodiments. Additionally, in some embodiments, the disc 1102 may be integrally formed with the wheel 212. At an inner diameter 1106 thereof, the disc 1102 is formed to include notches 1108 that are defined between circumferentially adjacent teeth 1109 of the disc 1102.

The illustrative brake assembly 1100 includes a braking device 1210 configured to contact an outer face 1112 of the disc 1102 to resist rotation of the wheel 212 about the axis 1104 in use of the land vehicle 100. In the illustrative embodiment, the braking device 1210 is embodied as, or otherwise includes, a disc brake assembly. The braking device 1210 includes a caliper 1220, one or more pistons 1230, and brake pads 1250. In addition, the braking device 1210 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The illustrative caliper 1220 of the braking device 1210 is embodied as, or otherwise includes, a housing 1222 of the braking device 1210 that at least partially houses a number of components of the braking device 1210, such as the piston(s) 1230, for example. In the illustrative embodiment, the braking device 1210 includes only one caliper 1220. Furthermore, in the illustrative embodiment, the braking device 1210 includes six pistons 1232, 1234, 1236, 1238, 1240, 1242 that are at least partially housed by the only one caliper 1220. However, in other embodiments, it should be appreciated that the braking device 1210 may include only one piston. The illustrative braking device 1210 also includes a pair of brake pads 1252, 1254 that are configured to contact opposite sides (i.e., outer and inner sides) of the disc 1102 to resist rotation of the wheel 212 about the axis 1104 in use of the vehicle 100.

The caliper 1220 of the braking device 1210 may have a variety of constructions. In the illustrative example, the caliper 1220 has a two-piece construction in which parts 1224, 1226 are secured to one another in close proximity to an end 1228 of the caliper 1220 by fasteners 1212. In the illustrative example, the parts 1224, 1226 are spaced apart from one another in close proximity to an end 1229 that is arranged opposite the end 1228. The brake pads 1252, 1254 are coupled to inner sides of the parts 1224, 1226 and arranged in confronting relation with one another to permit contact between the brake pads 1252, 1254 and the disc 1102 when the disc 1102 is positioned between the pads 1252, 1254 adjacent the end 1229. In the illustrative example, a sensor 1260 is coupled to the part 1224 of the caliper 1220 at an outer periphery thereof. The sensor 1260 is configured to provide a signal indicative of wear or degradation of the brake pads 1252, 1254 in use of the vehicle 100, at least in some embodiments. In other examples, however, the caliper 1220 may have another suitable construction and be formed from another suitable number of parts.

In some embodiments, the wheel 212 illustratively depicted in FIG. 11 is supported for rotation about the rotational axis 1104 by a bearing 1120. In such embodiments, a braking sensor 1122 is integrated into the bearing 1120. The illustrative braking sensor 1122 is configured to provide a signal to the control system 1600 indicative of a rotational speed of the wheel 212 in use of the vehicle 100, at least in some embodiments. The signal provided by the braking sensor 1122 may be utilized to control one or more components of an anti-lock brake system (not shown) included in the vehicle 100.

In some embodiments, fluid connections 1124 are located radially between the rotational axis 1104 and the inner diameter 1106 of the disc 1102. The fluid connections 1124 may be utilized to circulate cooling fluid delivered from a cooling fluid source (not shown) through the wheel 212 to cool the wheel 212 in use of the vehicle 100, at least in some embodiments. Each of the fluid connections 1124 may be embodied as, or otherwise include, a projection 1126 that extends outwardly away from an interior 1128 of the wheel 212 and parallel to the rotational axis 1104 such that the fluid connections 1124 are not generally not recessed. In some embodiments, a connector 1130 is located in the interior 1128 of the wheel 212 adjacent the fluid connections 1124. The connector 1130 may be configured to interface with a single low voltage cable 1132 that is at least partially positioned in the interior 1128.

Figure 13:
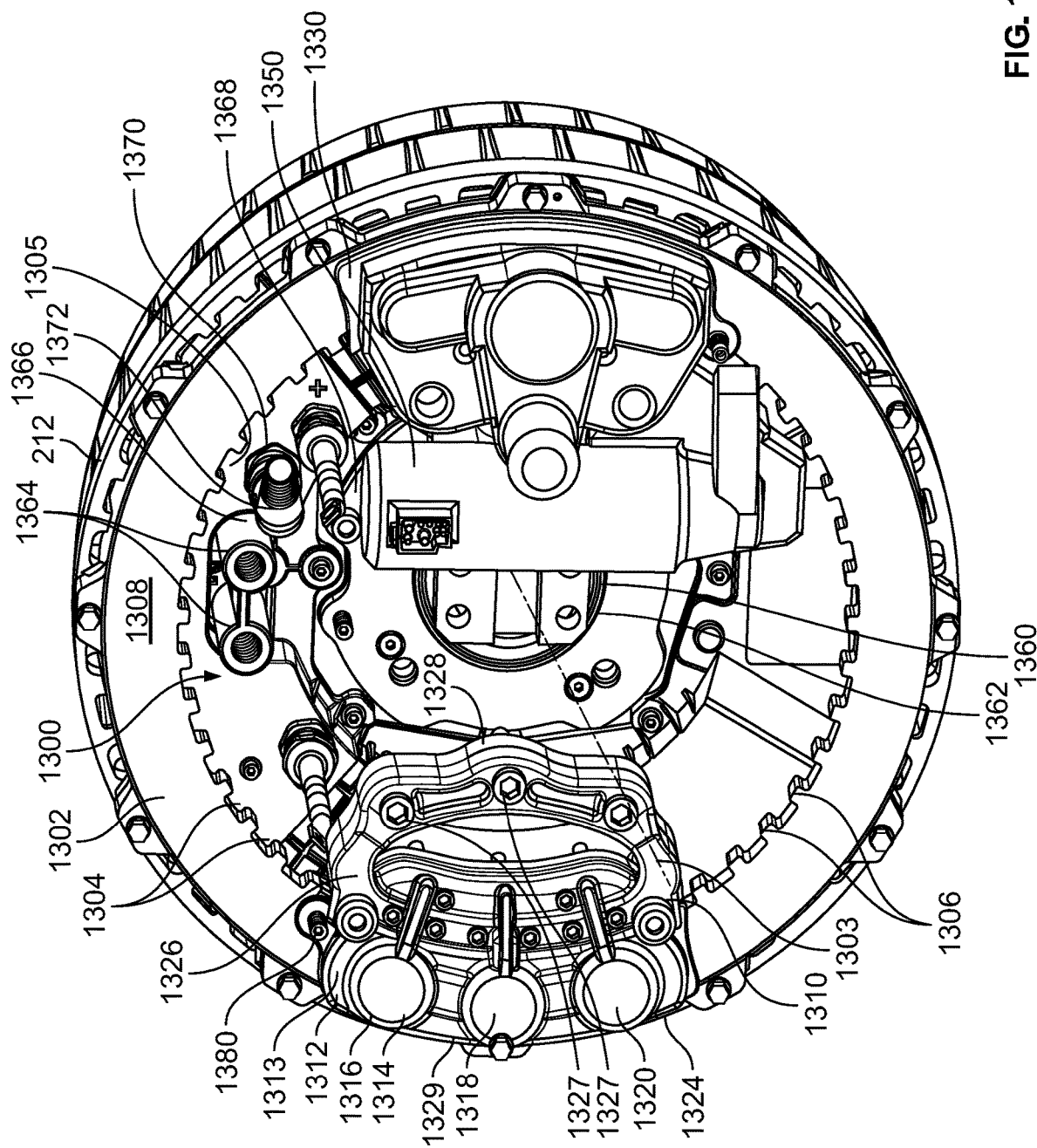
FIG. 13 is a side perspective view of a brake system coupled to a wheel according to another embodiment of the present disclosure.

Referring now to FIG. 13, as mentioned above, the illustrative brake system 1300 includes, among other things, a disc 1302, a braking device 1310, a braking device 1330, and a braking device 1350. It should be appreciated that any one of the braking devices 1310, 1330, 1350 may be activated to resist rotation of the wheel 212 in use of the vehicle 100 and thereby provide redundant braking means. Additionally, it should be appreciated that the multiple braking devices 1310, 1330, 1350 may be activated in combination with one another to cooperatively resist rotation of the wheel 212 in use of the vehicle 100. In any case, in some embodiments, the brake system 1300 may be coupled to the wheel 212 in lieu of the brake assembly 1100. Furthermore, in some embodiments, the brake system 1300 may be coupled to each one of the front wheels 214, 216 and the rear wheels 218, 220 such that the vehicle 100 includes four total brake systems 1300.

In the illustrative embodiment, the disc or rotor 1302 of the brake system 1300 is configured for rotation about a rotational axis 1303. The illustrative disc 1302 is coupled to the wheel 212 for common rotation therewith about the axis 1303, at least in some embodiments. Additionally, in some embodiments, the disc 1302 may be integrally formed with the wheel 212. At an inner diameter 1305 thereof, the disc 1302 is formed to include the notches 1304 that are defined between circumferentially adjacent teeth 1306 of the disc 1302.

The illustrative braking device 1310 is configured to contact the outer face 1308 of the disc 1302 to resist rotation of the wheel 212 about the axis 1303 in use of the land vehicle 100. In the illustrative embodiment, the braking device 1310 is embodied as, or otherwise includes, a disc brake assembly. The braking device 1310 includes a caliper 1312, one or more pistons 1314, and brake pads 1324. In addition, the braking device 1310 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The illustrative caliper 1312 of the braking device 1310 is embodied as, or otherwise includes, a housing 1313 of the braking device 1310 that at least partially houses a number of components of the braking device 1310, such as the piston(s) 1314, for example. In the illustrative embodiment, the braking device 1310 includes only one caliper 1312. Furthermore, in the illustrative embodiment, the braking device 1310 includes six pistons (only pistons 1316, 1318, 1320 are shown in FIG. 13) that are at least partially housed by the only one caliper 1312. However, in some embodiments, the braking device 1310 may include only one piston (e.g., one piston 1314). The illustrative braking device 1310 also includes a pair of brake pads (only brake pad 1324 is shown) that are configured to contact opposite sides (i.e., outer and inner sides) of the disc 1302 to resist rotation of the wheel 212 about the axis 1303 in use of the vehicle 100.

The caliper 1312 of the braking device 1310 may have a variety of constructions. In the illustrative example, the caliper 1312 has a two-piece construction in which two parts (only part 1326 is shown in FIG. 13) are secured to one another in close proximity to an end 1328 of the caliper 1312 by fasteners 1327. In the illustrative example, the parts of the caliper 1312 are spaced apart from one another in close proximity to an end 1329 that is arranged opposite the end 1328. The brake pads are coupled to inner sides of the parts and arranged in confronting relation with one another to permit contact between the brake pads and the disc 1302 when the disc 1302 is positioned between the pads adjacent the end 1329. In the illustrative example, a sensor 1380 is coupled to the part 1326 of the caliper 1312 at an outer periphery thereof. The sensor 1380 is configured to provide a signal indicative of wear or degradation of the brake pads in use of the vehicle 100, at least in some embodiments. In other examples, however, the caliper 1312 may have another suitable construction and be formed from another suitable number of parts.

In some embodiments, the wheel 212 illustratively depicted in FIG. 13 is supported for rotation about the rotational axis 1303 by a bearing 1360. In such embodiments, a braking sensor 1362 is integrated into the bearing 1360. The illustrative braking sensor 1362 is configured to provide a signal to the control system 1600 indicative of a rotational speed of the wheel 212 in use of the vehicle 100, at least in some embodiments. The signal provided by the braking sensor 1362 may be utilized to control one or more components of an anti-lock brake system (not shown) included in the vehicle 100.

In some embodiments, fluid connections 1364 are located radially between the rotational axis 1303 and the inner diameter 1305 of the disc 1302. The fluid connections 1364 may be utilized to circulate cooling fluid delivered from a cooling fluid source (not shown) through the wheel 212 to cool the wheel 212 in use of the vehicle 100, at least in some embodiments. Each of the fluid connections 1364 may be embodied as, or otherwise include, a projection 1366 that extends outwardly away from an interior 1368 of the wheel 212 and parallel to the rotational axis 1303 such that the fluid connections 1364 are not generally not recessed. In some embodiments, a connector 1370 is located in the interior 1368 of the wheel 212 adjacent the fluid connections 1364. The connector 1370 may be configured to interface with a single low voltage cable 1372 that is at least partially positioned in the interior 1368.

Figure 14:
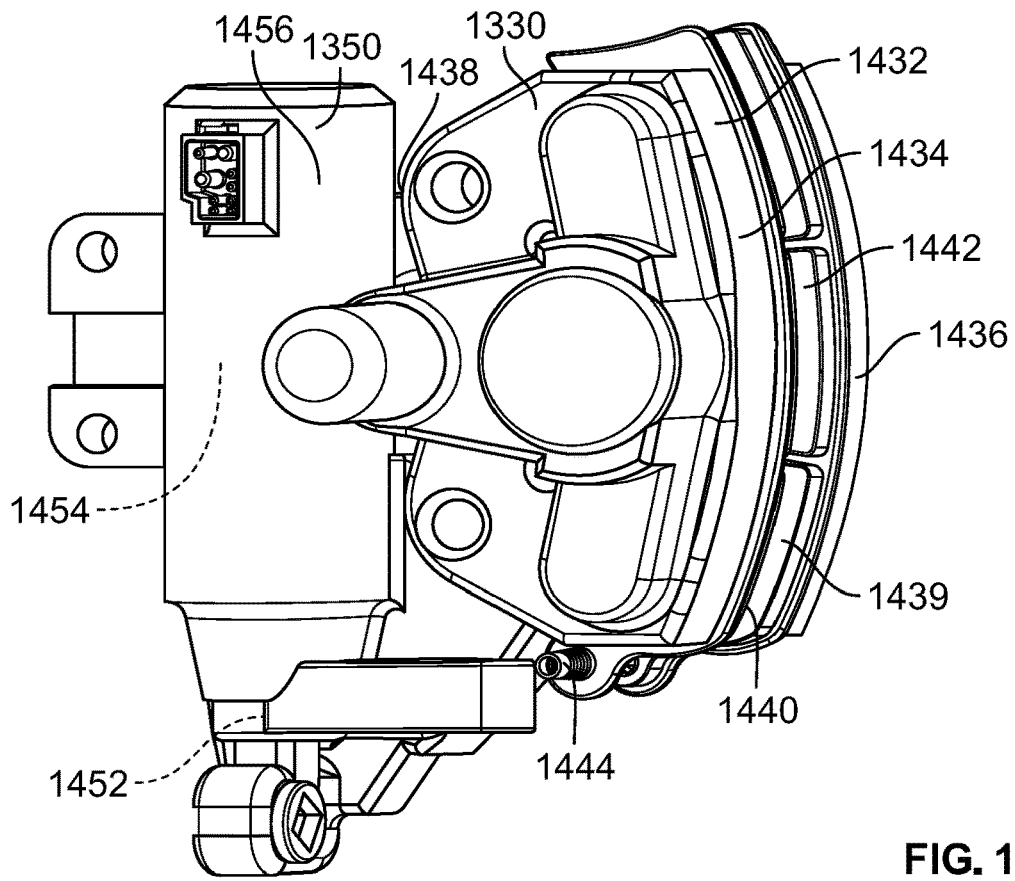
FIG. 14 is a detail view of several braking devices of the brake system of FIG. 13.

Referring now to FIG. 14, the braking devices 1330, 1350 are shown in greater detail with other elements (e.g., the wheel 212, the disc 1302, the braking device 1310) omitted for the sake of simplicity. In the illustrative embodiment, the braking device 1330 is an electronic parking brake mechanism. Additionally, in the illustrative embodiment, the braking device 1350 is a parking pawl mechanism. It should be appreciated that in use of the vehicle 100, the braking devices 1330, 1350 may be operated by the control system 1600 independently of one another, as further discussed below.

As mentioned above, the illustrative electronic parking brake mechanism 1330 is configured to contact the outer face 1308 of the disc 1302 to resist rotation of the wheel 212 about the axis 1303 in use of the vehicle 100. As best seen in FIG. 13, the parking brake mechanism 1330 is circumferentially spaced from the braking device 1310 about the disc 1302 and the axis 1303. More specifically, the parking brake mechanism 1330 and the braking device 1310 are circumferentially spaced about 180 degrees from one another about the disc 1302 and the axis 1303. In the illustrative arrangement, among other components, the fluid connections 1364 and the connector 1370 are circumferentially located between the parking brake mechanism 1330 and the braking device 1310.

At least in some embodiments, the illustrative parking brake mechanism 1330 includes a number of features similar to corresponding features of the braking device 1310. In such embodiments, the parking brake mechanism 1330 includes a housing 1432, one or more actuators or pistons 1438 at least partially housed by the housing 1432, and brake pads 1440, 1442 supported by the housing 1432 that are configured to contact opposite sides (i.e., outer and inner sides) of the disc 1302 to resist rotation of the wheel 212 about the axis 1303 in use of the vehicle 100. In addition, the parking brake mechanism 1330 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The housing 1432 of the parking brake mechanism 1330 may have a variety of constructions. In some embodiments, the housing 1432 of the parking brake mechanism 1330 may have a two-piece construction. In the illustrative example, the illustrative housing 1432 includes two parts 1434, 1436 that are secured to one another in close proximity to an end 1438 of the housing 1432. In the illustrative example, the parts 1434, 1436 of the housing 1432 are spaced apart from one another in close proximity to an end 1439 that is arranged opposite the end 1438. The brake pads 1440, 1442 are coupled to inner sides of the parts 1434, 1436 and arranged in confronting relation with one another to permit contact between the brake pads 1440, 1442 and the disc 1302 when the disc 1302 is positioned between the pads adjacent the end 1439. In the illustrative embodiment, a sensor 1444 is coupled to the half 1434 of the housing 1432 at an outer periphery thereof. The sensor 1444 is configured to provide a signal indicative of wear or degradation of the brake pads 1440, 1442 in use of the vehicle 100, at least in some embodiments. Of course, it should be appreciated that in other embodiments, the housing 1432 may have another suitable construction and be formed from another suitable number of parts.

As mentioned above, the illustrative parking pawl mechanism 1350 is configured to contact one or more teeth 1306 of the disc 1302 to resist rotation of the wheel 212 in use of the vehicle 100. Unlike some conventional devices, the illustrative parking pawl mechanism 1350 is not fitted to, and does not interact with, a transmission of the vehicle 100, since the vehicle 100 omits one or more transmissions as indicated above. Thus, unlike some conventional devices, the illustrative parking pawl mechanism 1350 does not lock an output shaft of a transmission to prevent rotation of the wheel 212.

In the illustrative embodiment, the parking pawl mechanism 1350 includes a pawl or pin 1452 at least partially housed by a housing 1456. The pawl 1452 may be sized to contact one or more of the teeth 1306 in use of the mechanism 1350. Additionally, in some embodiments, the parking pawl mechanism 1350 may include one or more actuators 1454 at least partially housed by the housing 1456. The one or more actuators 1454 are configured to drive movement (e.g., extension) of the pawl 1452 relative to the housing 1456 to contact one or more of the teeth 1306 and thereby resist rotation of the wheel 212, at least in some embodiments. Additionally, in such embodiments, the one or more actuators 1454 are configured to drive movement (i.e., retraction) of the pawl 1452 relative to the housing 1456 to release the pawl 1452 and thereby permit rotation of the wheel 212.

Figure 15:
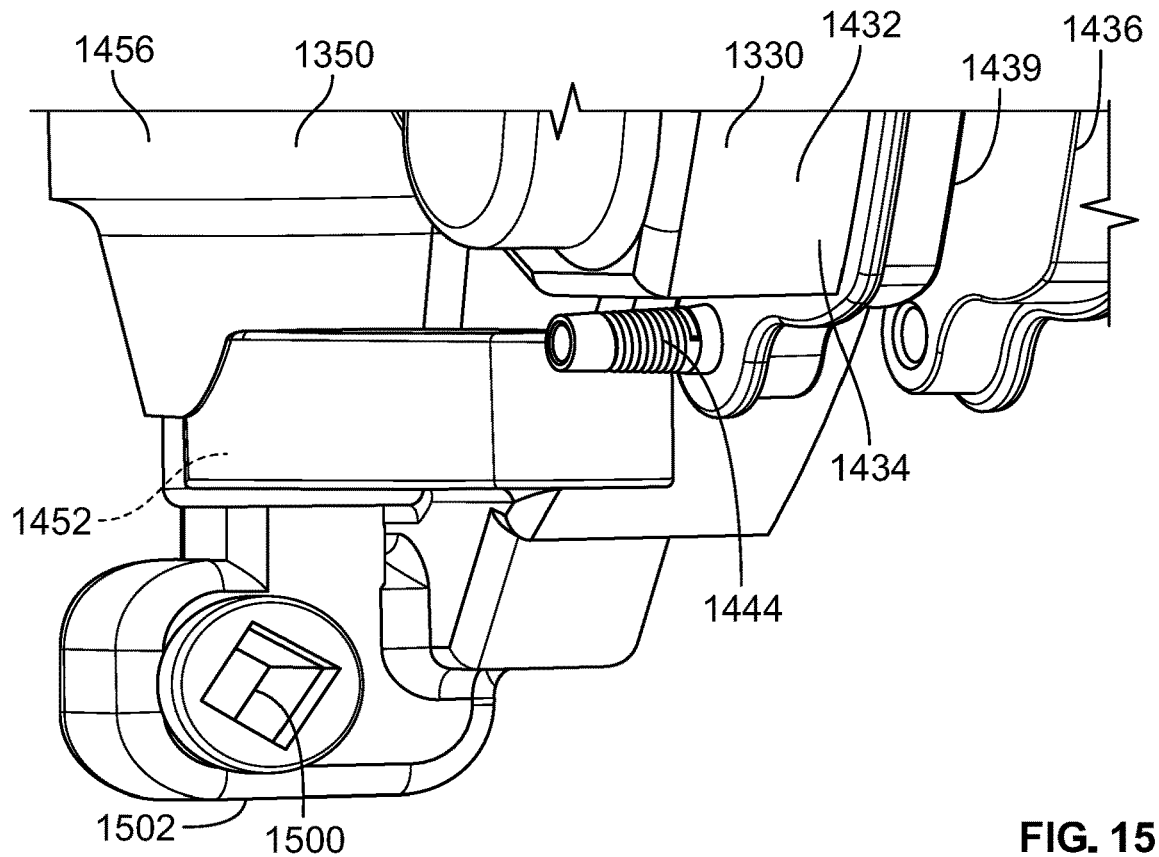
FIG. 15 is a detail view of a portion of one of the several braking devices of FIG. 14.

Referring now to FIG. 15, the illustrative parking pawl mechanism 1350 includes a receptacle 1500 disposed at an end 1502 of the mechanism 1350. The receptacle 1500 is sized to receive a drive or release (e.g., a square drive or release) to permit manual release of the parking pawl mechanism 1350 in use of the vehicle 100. Of course, it should be appreciated that manual release of the mechanism 1350 may be desirable in the event that automatic release of the pawl 1452 is not attainable. Furthermore, it should be appreciated that although the receptacle 1500 is depicted in FIG. 15 as having a square shape, in other embodiments, the receptacle 1500 may take the shape of other suitable geometric forms. In such embodiments, the shape and size of the receptacle 1500 may be dependent upon the shape and size of the corresponding drive or release.

Figure 16:
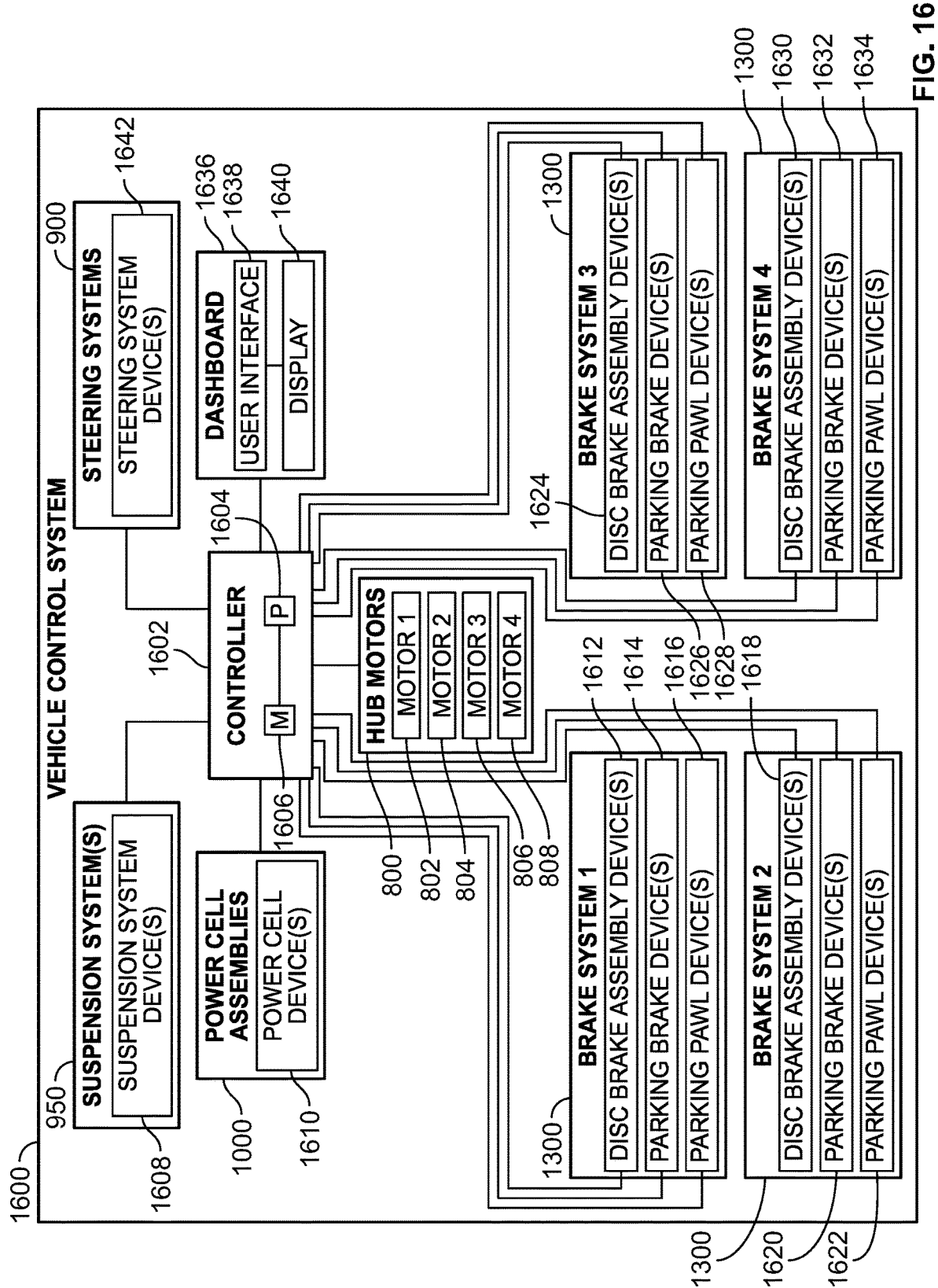
FIG. 16 is a diagrammatic view of a control system that may be included in the electric vehicle of FIG. 1.

Referring now to FIG. 16, the illustrative control system 1600 is utilized to control operation of various components and/or systems of the land vehicle 100. The control system 1600 illustratively includes a controller 1602 having a processor 1604 and a memory device 1606 coupled to the processor 1604. In the illustrative embodiment, the controller 1602 is communicatively coupled to (i) the one or suspension systems 950, (ii) the one or more power cell assemblies 1000, (iii) the brake systems 1300, (iv) the electric motors 800, (v) a dashboard 1636, and (vi) the one or more steering systems 900.

The processor 1604 may be embodied as, or otherwise include, any type of processor, controller, or other compute circuit capable of performing various tasks such as compute functions and/or controlling the functions of the land vehicle 100 and subcomponents or subsystems thereof. For example, the processor 1604 may be embodied as a single or multi-core processor(s), a microcontroller, or other processor or processing/controlling circuit. In some embodiments, the processor 1604 may be embodied as, include, or be coupled to an FPGA, an application specific integrated circuit (ASIC), reconfigurable hardware or hardware circuitry, or other specialized hardware to facilitate performance of the functions described herein. Additionally, in some embodiments, the processor 1604 may be embodied as, or otherwise include, a high-power processor, an accelerator co-processor, or a storage controller. In some embodiments still, the processor 1604 may include more than one processor, controller, or compute circuit.

The memory device 1606 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 1606 may be embodied as a block addressable memory, such as those based on NAND or NOR technologies. The memory device 1606 may also include future generation nonvolatile devices, such as a three dimensional crosspoint memory device (e.g., Intel 3D XPoint™ memory), or other byte addressable write-in-place nonvolatile memory devices. In some embodiments, the memory device 1606 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

In the illustrative embodiment, the controller 1602 is communicatively coupled to one or more suspension system devices 1608 of the suspension systems 950. The suspension system devices 1608 are illustratively embodied as, or otherwise include, any devices of the suspension systems 950 that are capable of providing electrical signals to the controller 1602 and/or receiving electrical signals from the controller 1602 to facilitate operation and control of the suspension systems 950. In some embodiments, the suspension system devices 1608 include one or more sensors, switches, actuators, and/or solenoids, among other features. Of course, it should be appreciated that in other embodiments, the suspension system devices 1608 may include other suitable components.

In the illustrative embodiment, the controller 1602 is communicatively coupled to one or more power cell devices 1610 of the power cell assembly 1000. The power cell devices 1610 are illustratively embodied as, or otherwise include, any devices of the power cell assembly 1000 that are capable of providing electrical signals to the controller 1602 and/or receiving electrical signals from the controller 1602 to facilitate operation and control of the power cell assembly 1000. In some embodiments, the power cell devices 1610 include one or more sensors, switches, actuators, and/or solenoids, among other things. Of course, it should be appreciated that in other embodiments, the power cell devices 1610 may include other suitable components.

In the illustrative embodiment of FIG. 16, the controller 1602 is depicted as being communicatively coupled to the electric or hub motors 800, which include the motors 802, 804, 806, 808 as discussed above. It should be appreciated that each of the motors 802, 804, 806, 808 may be communicatively coupled to the controller 1602 to permit independent operation and control thereof by the controller 1602, at least in some embodiments. In such embodiments, it should further be appreciated that various electrical devices (e.g., sensors, switches, actuators, solenoids, etc.) of each of the motors 802, 804, 806, 808 are also communicatively coupled to the controller 1602.

In the illustrative embodiment, the controller 1602 is communicatively coupled to a first brake system 1300 (e.g., the brake system 1300 coupled to the front wheel 214) of the land vehicle 100. More specifically, the controller 1602 is communicatively coupled to one or more disc brake assembly devices 1612, one or more parking brake devices 1614, and one or more parking pawl devices 1616 of the first brake system 1300. The one or more disc brake assembly devices 1612 are included in, or otherwise associated with, the braking device 1310 of the brake system 1300. The one or more disc brake assembly devices 1612 are illustratively embodied as, or otherwise include, any devices of the braking device 1310 that are capable of providing electrical signals to the controller 1602 and/or receiving electrical signals from the controller 1602 to facilitate operation and control of the braking device 1310. The one or more parking brake devices 1614 are included in, or otherwise associated with, the braking device 1330 of the brake system 1300. The one or more parking brakes devices 1614 are illustratively embodied as, or otherwise include, any devices of the braking device 1330 that are capable of providing electrical signals to the controller 1602 and/or receiving electrical signals from the controller 1602 to facilitate operation and control of the braking device 1330. The one or more parking pawl devices 1616 are included in, or otherwise associated with, the braking device 1350 of the brake system 1300. The one or more parking pawl devices 1616 are illustratively embodied as, or otherwise include, any devices of the braking device 1350 that are capable of providing electrical signals to the controller 1602 and/or receiving electrical signals from the controller 1602 to facilitate operation and control of the braking device 1350. In some embodiments, each of the devices 1612, 1614, 1616 may include one or more sensors, switches, actuators, and/or solenoids, among other things. Of course, it should be appreciated that in other embodiments, each of the devices 1612, 1614, 1616 may include other suitable components.

In the illustrative embodiment, the controller 1602 is communicatively coupled to a second brake system 1300 (e.g., the brake system 1300 coupled to the front wheel 216) of the land vehicle 100. More specifically, the controller 1602 is communicatively coupled to one or more disc brake assembly devices 1618, one or more parking brake devices 1620, and one or more parking pawl devices 1622 of the second brake system 1300. The one or more disc brake assembly devices 1618 are included in, or otherwise associated with, the braking device 1310 of the brake system 1300. The one or more disc brake assembly devices 1618 are illustratively embodied as, or otherwise include, any devices of the braking device 1310 that are capable of providing electrical signals to the controller 1602 and/or receiving electrical signals from the controller 1602 to facilitate operation and control of the braking device 1310. The one or more parking brake devices 1620 are included in, or otherwise associated with, the braking device 1330 of the brake system 1300. The one or more parking brakes devices 1620 are illustratively embodied as, or otherwise include, any devices of the braking device 1330 that are capable of providing electrical signals to the controller 1602 and/or receiving electrical signals from the controller 1602 to facilitate operation and control of the braking device 1330. The one or more parking pawl devices 1622 are included in, or otherwise associated with, the braking device 1350 of the brake system 1300. The one or more parking pawl devices 1622 are illustratively embodied as, or otherwise include, any devices of the braking device 1350 that are capable of providing electrical signals to the controller 1602 and/or receiving electrical signals from the controller 1602 to facilitate operation and control of the braking device 1350. In some embodiments, each of the devices 1618, 1620, 1622 may include one or more sensors, switches, actuators, and/or solenoids, among other things. Of course, it should be appreciated that in other embodiments, each of the devices 1618, 1620, 1622 may include other suitable components.

In the illustrative embodiment, the controller 1602 is communicatively coupled to a third brake system 1300 (e.g., the brake system 1300 coupled to the rear wheel 218) of the land vehicle 100. More specifically, the controller 1602 is communicatively coupled to one or more disc brake assembly devices 1624, one or more parking brake devices 1626, and one or more parking pawl devices 1628 of the third brake system 1300. The one or more disc brake assembly devices 1624 are included in, or otherwise associated with, the braking device 1310 of the brake system 1300. The one or more disc brake assembly devices 1624 are illustratively embodied as, or otherwise include, any devices of the braking device 1310 that are capable of providing electrical signals to the controller 1602 and/or receiving electrical signals from the controller 1602 to facilitate operation and control of the braking device 1310. The one or more parking brake devices 1626 are included in, or otherwise associated with, the braking device 1330 of the brake system 1300. The one or more parking brakes devices 1626 are illustratively embodied as, or otherwise include, any devices of the braking device 1330 that are capable of providing electrical signals to the controller 1602 and/or receiving electrical signals from the controller 1602 to facilitate operation and control of the braking device 1330. The one or more parking pawl devices 1628 are included in, or otherwise associated with, the braking device 1350 of the brake system 1300. The one or more parking pawl devices 1628 are illustratively embodied as, or otherwise include, any devices of the braking device 1350 that are capable of providing electrical signals to the controller 1602 and/or receiving electrical signals from the controller 1602 to facilitate operation and control of the braking device 1350. In some embodiments, each of the devices 1624, 1626, and 1628 may include one or more sensors, switches, actuators, and/or solenoids, among other things. Of course, it should be appreciated that in other embodiments, each of the devices 1624, 1626, and 1628 may include other suitable components.

In the illustrative embodiment, the controller 1602 is communicatively coupled to a fourth brake system 1300 (e.g., the brake system 1300 coupled to the rear wheel 220) of the land vehicle 100. More specifically, the controller 1602 is communicatively coupled to one or more disc brake assembly devices 1630, one or more parking brake devices 1632, and one or more parking pawl devices 1634 of the fourth brake system 1300. The one or more disc brake assembly devices 1630 are included in, or otherwise associated with, the braking device 1310 of the brake system 1300. The one or more disc brake assembly devices 1630 are illustratively embodied as, or otherwise include, any devices of the braking device 1310 that are capable of providing electrical signals to the controller 1602 and/or receiving electrical signals from the controller 1602 to facilitate operation and control of the braking device 1310. The one or more parking brake devices 1632 are included in, or otherwise associated with, the braking device 1330 of the brake system 1300. The one or more parking brakes devices 1632 are illustratively embodied as, or otherwise include, any devices of the braking device 1330 that are capable of providing electrical signals to the controller 1602 and/or receiving electrical signals from the controller 1602 to facilitate operation and control of the braking device 1330. The one or more parking pawl devices 1634 are included in, or otherwise associated with, the braking device 1350 of the brake system 1300. The one or more parking pawl devices 1634 are illustratively embodied as, or otherwise include, any devices of the braking device 1350 that are capable of providing electrical signals to the controller 1602 and/or receiving electrical signals from the controller 1602 to facilitate operation and control of the braking device 1350. In some embodiments, each of the devices 1630, 1632, and 1634 may include one or more sensors, switches, actuators, and/or solenoids, among other things. Of course, it should be appreciated that in other embodiments, each of the devices 1630, 1632, and 1634 may include other suitable components.

The illustrative controller 1602 is communicatively coupled to the dashboard 1636 as indicated above. The dashboard 1636 includes a user interface 1638 and a display 1640 coupled to the user interface 1638. The user interface 1638 is configured to provide various inputs to the control system 1600 based on various actions, which may include actions performed by an operator. The display 1640 is configured to output or display various indications, messages, and/or prompts to an operator, which may be generated by the control system 1600. It should be appreciated that in some embodiments, the user interface 1638 and the display 1640 are positioned in the operator cabin 206.

In the illustrative embodiment, the controller 1602 is communicatively coupled to one or more steering system devices 1642 of the steering systems 900. The steering system devices 1642 are illustratively embodied as, or otherwise include, any devices of the steering systems 900 that are capable of providing electrical signals to the controller 1602 and/or receiving electrical signals from the controller 1602 to facilitate operation and control of the steering systems 900. In some embodiments, the steering system devices 1642 include one or more sensors, switches, actuators, and/or solenoids, among other features. Of course, it should be appreciated that in other embodiments, the suspension system devices 1642 may include other suitable components.

Figure 17:
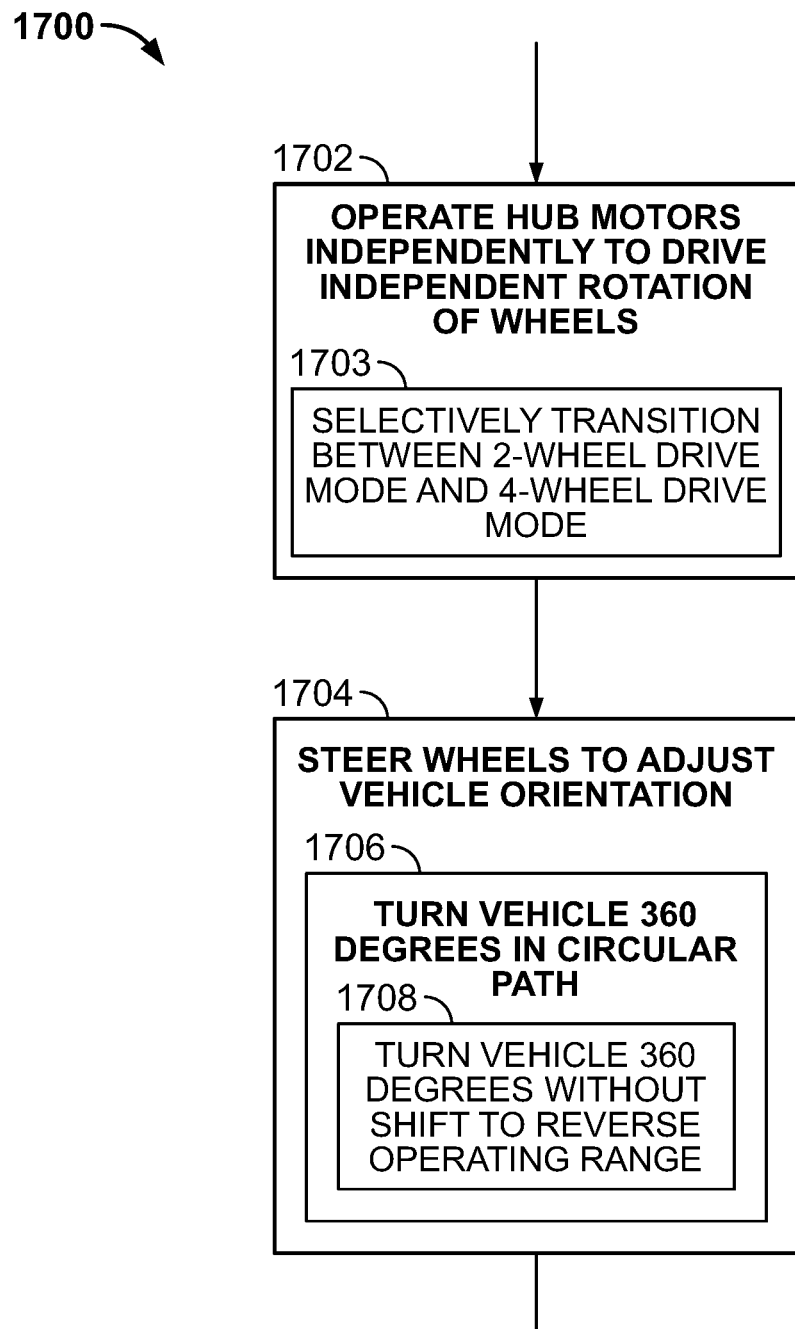
FIG. 17 is a simplified flowchart of a method of operating the electric vehicle of FIG. 1 according to one embodiment of the present disclosure.

Referring now to FIG. 17, an illustrative method 1700 of operating the land vehicle 100 may be embodied as, or otherwise include, a set of instructions that are executable by the control system 1600 to control operation of the vehicle 100. The method 1700 corresponds to, or is otherwise associated with, performance of the blocks described below in the illustrative sequence of FIG. 17. It should be appreciated, however, that the method 1700 may be performed in one or more sequences different from the illustrative sequence. Furthermore, in some embodiments, it should be appreciated that one or more blocks of the illustrative method 1700 may be performed manually by a user or operator of the vehicle 100.

The illustrative method 1700 begins with block 1702. In block 1702, the controller 1602 (or an operator) operates, or directs operation of, the hub motors 800 independently of one another to drive independent rotation of the wheels 212. It should be appreciated that in some embodiments, performance of block 1702 includes, or is otherwise associated with, driving rotation of the front wheels 214, 216 and the rear wheels 218, 220 independently via the hub motors 800 in one or more four-wheel drive mode(s) of the vehicle 100. In some embodiments, to perform block 1702, the controller 1602 (or an operator) performs block 1703. In block 1703, the controller 1602 (or an operator) selectively transitions between a two-wheel drive operational mode and a four-wheel drive operational mode of the vehicle 100. In one example, the two-wheel drive operational mode may be a mode in which rotation of only the front wheels 214, 216 is driven by the hub motors 800. In another example, the two-wheel drive operational mode may be a mode in which rotation of only the rear wheels 218, 220 is driven by the hub motors 800. In some embodiments, the selective transition between the two-wheel drive operational mode and the four-wheel drive operational mode in block 1703 may be dependent upon the terrain or the grade of the surface underlying the vehicle 100. Regardless, following completion of blocks 1702 and 1703, the method 1700 subsequently proceeds to block 1704.

In block 1704 of the illustrative method 1700, the controller 1602 (or an operator) steers the wheels 212 to adjust an orientation of the vehicle 100. To do so, in block 1706, the controller 1602 (or an operator) turns the vehicle 100 360 degrees in a circular path. To perform block 1706, in the illustrative embodiment, the controller 1602 (or an operator) performs block 1708. In block 1708, the controller 1602 (or an operator) turns the vehicle 100 360 degrees in the circular path without shifting the land vehicle (e.g., using a shift selector disposed in the operator cabin 206) to a reverse operating range.

Figure 18:
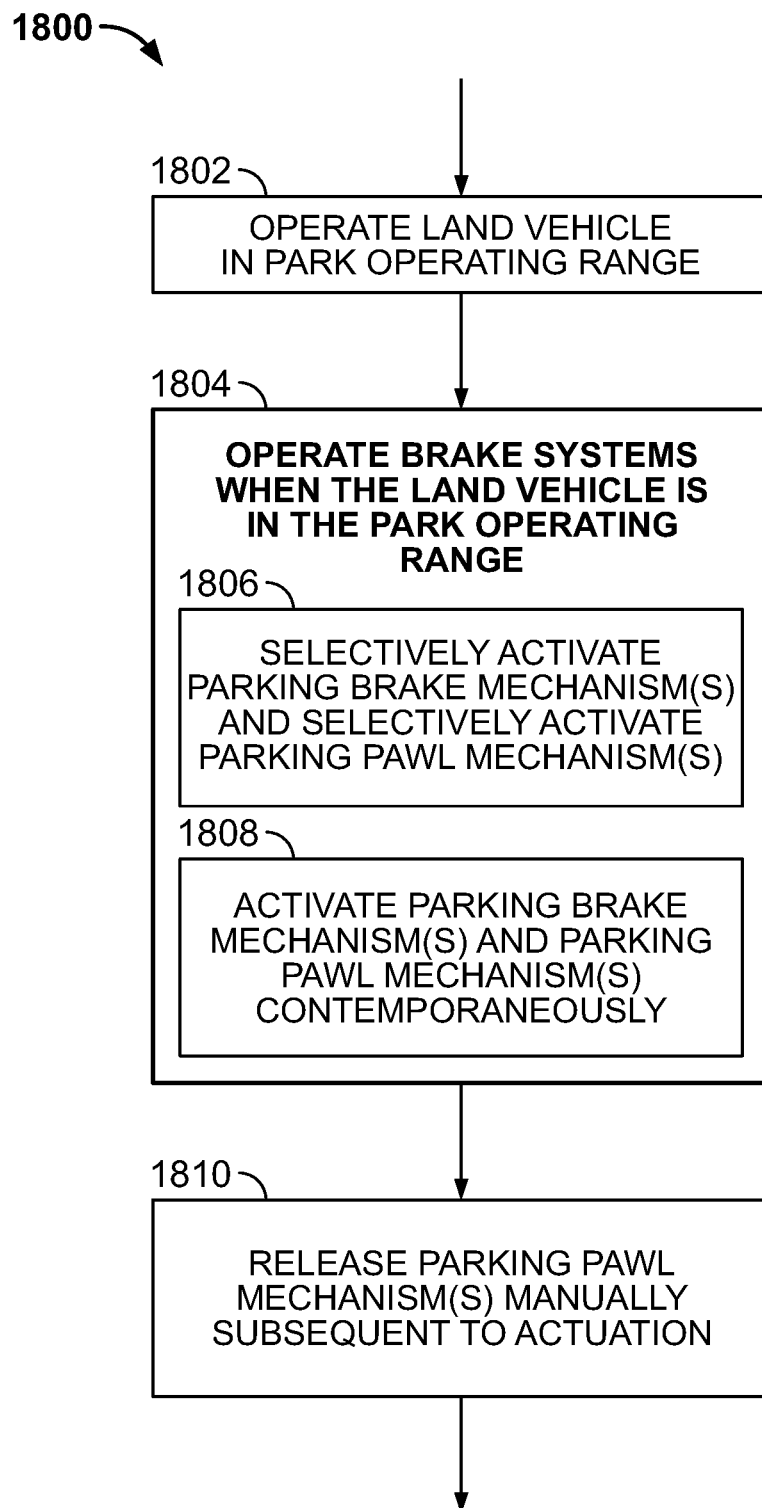
FIG. 18 is a simplified flowchart of a method of operating the electric vehicle of FIG. 1 according to another embodiment of the present disclosure.

Referring now to FIG. 18, an illustrative method 1800 of operating the land vehicle 100 may be embodied as, or otherwise include, a set of instructions that are executable by the control system 1600 to control operation of the vehicle 100. The method 1800 corresponds to, or is otherwise associated with, performance of the blocks described below in the illustrative sequence of FIG. 18. It should be appreciated, however, that the method 1800 may be performed in one or more sequences different from the illustrative sequence. Furthermore, in some embodiments, it should be appreciated that one or more blocks of the illustrative method 1800 may be performed manually by a user or operator of the vehicle 100.

The illustrative method 1800 begins with block 1802. In block 1802, the controller 1602 (or an operator) operates, or directs operation of, the land vehicle 100 in a park operating range. From block 1802, the method 1800 subsequently proceeds to block 1804.

In block 1804 of the illustrative method 1800, the controller 1602 (or an operator) operates the brake systems 1300 of the vehicle 100 when the vehicle 100 is in the park operating range. To do so, in the illustrative embodiment, the controller 1602 (or an operator) performs at least one or both of blocks 1806 and 1808. In block 1806, the controller 1602 (or an operator) selectively activates or engages one or more parking brake mechanisms 1330 and one or more parking pawl mechanisms 1350. In block 1808, the controller 1602 (or an operator) activates or engages the one or more parking brake mechanisms 1330 and the one or more parking pawl mechanisms 1350 contemporaneously. In any case, from block 1804, the method 1800 subsequently proceeds to block 1810.

In block 1810 of the illustrative method 1800, the controller 1602 (or an operator) releases, or directs the release of, one or more parking pawl mechanisms 1350 manually subsequent to activation of the one or more mechanisms 1350.

Figure 19:
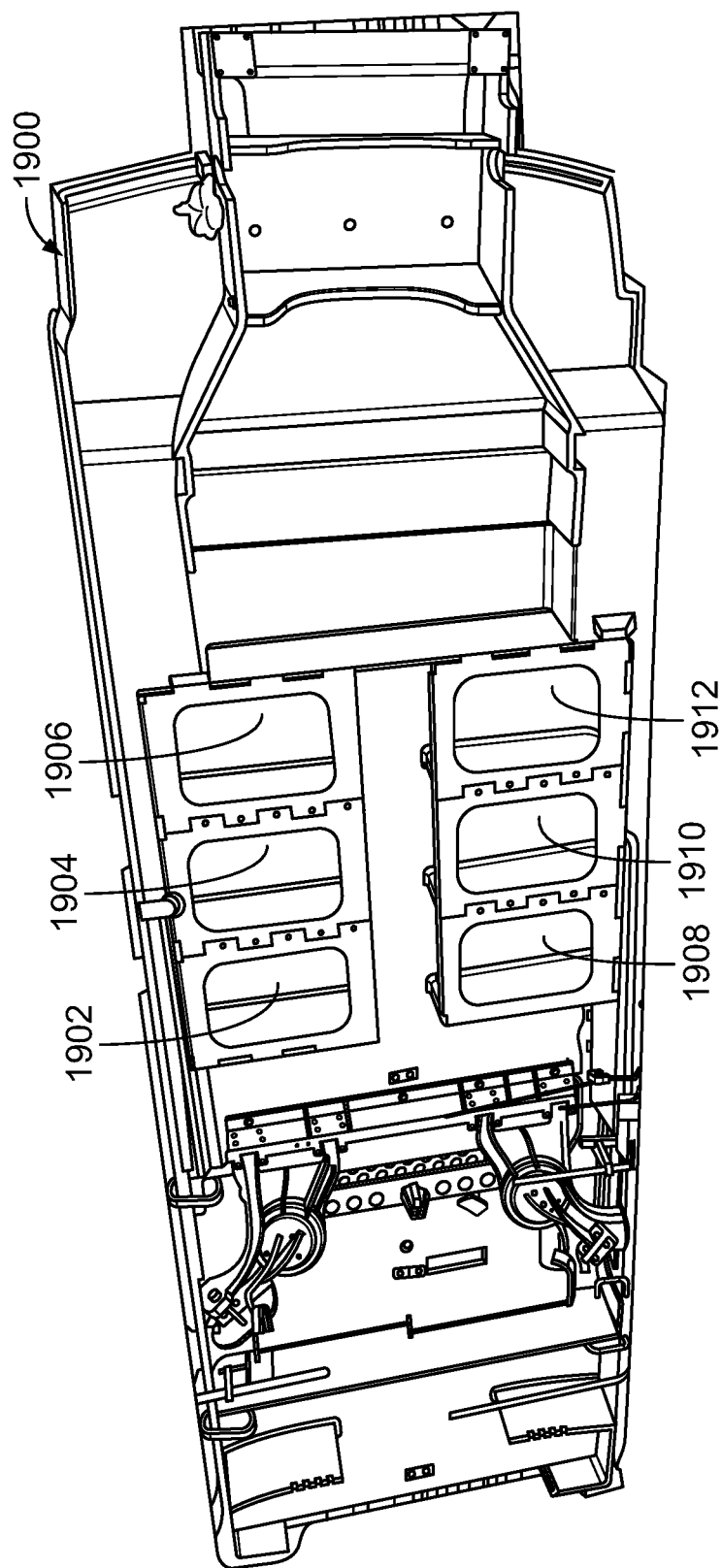
FIG. 19 is a bottom perspective view of a carriage configured to hold one or more battery pack modules.

Referring now to FIG. 19, an illustrative carriage 1900 may be supported by, coupled to, or integrally formed with, the frame structure 200 of the vehicle 100. In some embodiments, the carriage 1900 may be integrated into, or otherwise form a portion of, the carrier 222. Furthermore, in some embodiments, the carriage 1900 may be supported by the rails 230, 240 such that the carriage 1900 extends longitudinally along the rails 230, 240 and laterally between the rails 230, 240.

The carriage 1900 illustratively includes a plurality of compartments 1902, 1904, 1906, 1908, 1910, 1912. Although six compartments are depicted in FIG. 19, it should be appreciated that the number of compartments may vary depending on the number of battery pack modules 2010 (see FIG. 20) included in a modular system 2000 of the vehicle 100. In any case, each of the compartments 1902, 1904, 1906, 1908, 1910, 1912 is configured to receive and secure a battery pack module, which may be used to power one or more of the electric motors 800 in use of the vehicle 100, among other things.

Figure 20:
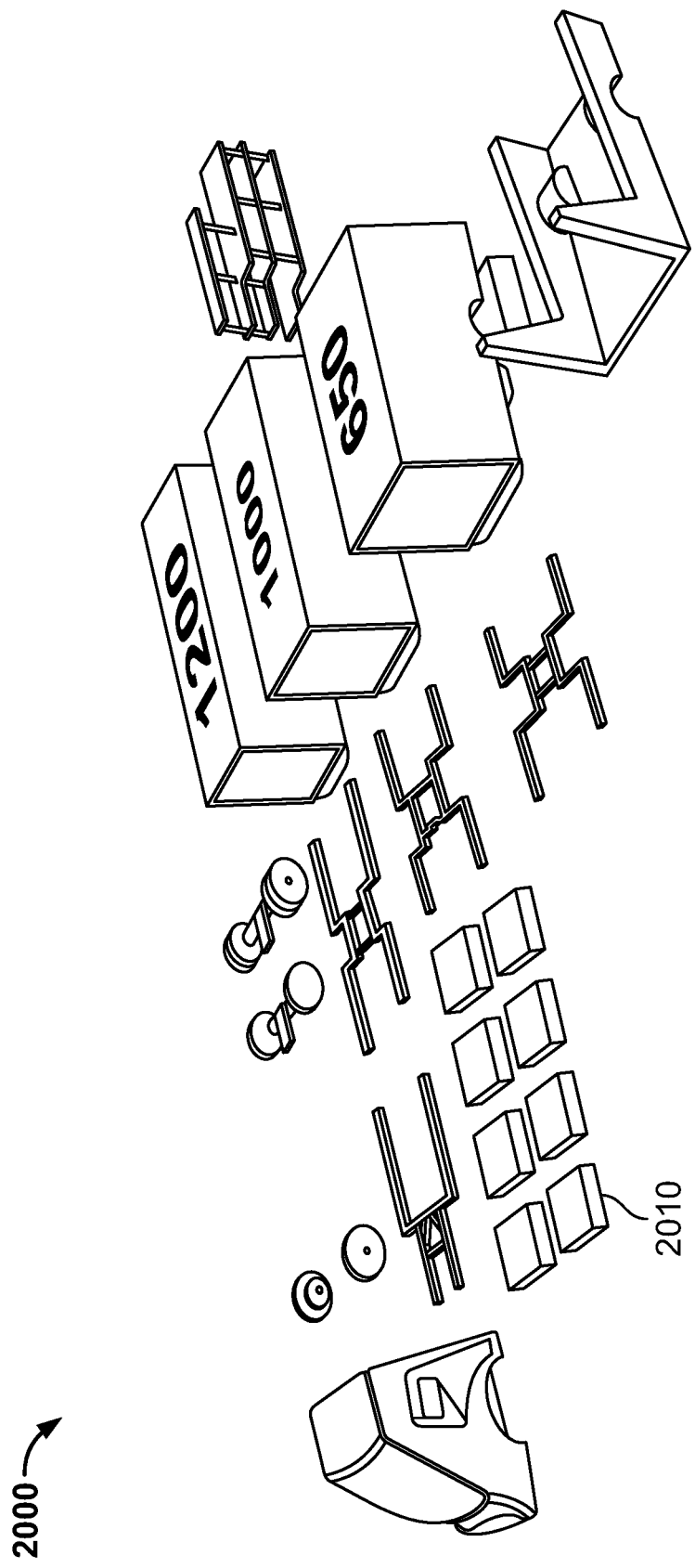
FIG. 20 is a perspective view of a modular system including one or more battery pack modules that may be secured by the carriage of FIG. 19.

Referring now to FIG. 20, in some embodiments, the vehicle 100 may include the modular system 2000 that has, among other things, the battery pack modules 2010. Each of the battery pack modules 2010 illustratively includes one or more power cells, such as the power cells 1050 described below with reference to FIG. 10, for example. In some embodiments, each of the battery pack modules 2010 may be included in, or otherwise form a portion of, each of the power cell assemblies 300, 1000 discussed above. Additionally, in some embodiments, each of the power cell assemblies 300, 1000 may include one or more battery pack modules 2010.

In the illustrative embodiment, one or more battery pack modules may be added and integrated into the modular system 2000 or removed from the modular system 2000. Addition or removal of the one or more battery pack modules may be dependent upon a variety of factors. In one example, addition of one or more battery pack modules into the system 2000 may be desirable to provide one or more auxiliary or supplemental power sources for particular application(s) of the vehicle 100, such as during time periods in which heavy usage of the vehicle 100 is expected, for instance. Of course, to hold any additional battery pack modules, the carriage 1900 may be formed to include additional compartments. In another example, one or more battery pack modules may be removed from the system 2000 to, among other things, reduce the weight of the vehicle 100, which may be desirable during time periods in which light usage of the vehicle 100 is expected (e.g., during holidays), for instance. In those situations, one or more compartments may be removed from the carriage 1900, as the case may be. It should be appreciated that the number of battery pack modules provided in the modular system 2000 may be dictated by the particular implementation of the vehicle 100.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A land vehicle comprising:
   a frame structure including a front cage that at least partially defines an operator cabin and a rear compartment positioned rearward of the front cage in a longitudinal direction;
   a plurality of wheels supported by the frame structure, wherein the plurality of wheels includes a pair of front wheels and a pair of rear wheels positioned rearward of the pair of front wheels in the longitudinal direction;
   a plurality of electric motors to generate rotational power that are supported by the plurality of wheels, wherein the plurality of electric motors includes a first electric motor integrated directly into one of the pair of front wheels, a second electric motor integrated directly into the other of the pair of front wheels, a third electric motor integrated directly into one of the pair of rear wheels, and a fourth electric motor integrated directly into the other of the pair of rear wheels; and
   a power cell assembly to supply electrical power to the plurality of electric motors that is supported by the frame structure, wherein the power cell assembly is at least partially housed by a carrier positioned between the pair of front wheels and the pair of rear wheels in the longitudinal direction, and wherein the power cell assembly comprises
   a bottom tray;
   a casing supported by the bottom tray that houses a plurality of cooling plates to dissipate heat generated by the power cell assembly in use thereof;
   an intermediate tray at least partially positioned in the casing;
   a plurality of power cells at least partially positioned in the intermediate tray; and
   a top cover that cooperates with the bottom tray, the casing, and the intermediate tray to at least partially enclose the plurality of power cells.

2. The land vehicle of claim 1, wherein the operator cabin comprises:
   a steering wheel;
   an operator seat; and
   a rack arranged in the operator cabin opposite the steering wheel and the operator seat that includes a plurality of trays.

3. The land vehicle of claim 2, wherein:
   the operator cabin comprises a pair of tracks affixed to a floor of the operator cabin and spaced apart from one another in the longitudinal direction; and
   the rack is movable along the pair of tracks in a lateral direction perpendicular to the longitudinal direction between a stowed position, in which the rack is disposed distant from the operator seat, and a delivery position, in which the rack is disposed close to the operator seat.

4. The land vehicle of claim 3, wherein the land vehicle has a gross vehicular weight rating (GVWR) of between 10,001 pounds and 14,000 pounds.

5. The land vehicle of claim 1, wherein each of the plurality of electric motors is configured to generate about 100 horsepower (hp).

6. The land vehicle of claim 5, wherein the power cell assembly includes a modular system having one or more battery pack modules each configured to supply electrical power to the plurality of electric motors in use of the vehicle, and wherein in use of the vehicle, battery pack modules are added to, or removed from, the modular system depending on a particular delivery mission of the vehicle.

7. The land vehicle of claim 1, wherein each of the plurality of electric motors is coupled to one of the plurality of wheels without any transmission gearing interposed therebetween.

8. The land vehicle of claim 7, wherein the land vehicle does not include an internal combustion engine.

9. The land vehicle of claim 1, wherein:
   the frame structure includes a pair of rails that each extends from a first end arranged forward of the pair of front wheels in the longitudinal direction to a second end arranged rearward of the pair of rear wheels in the longitudinal direction;
   the pair of rails are spaced apart a first distance from one another in the location of the carrier;
   the pair of rails are spaced apart a second distance from one another in a location forward of the carrier that is less than the first distance; and
   the pair of rails are spaced apart a third distance from one another in a location rearward of the carrier that is less than the first distance and greater than the second distance.

10. A land vehicle comprising:
    a frame structure including a front cage that at least partially defines an operator cabin and a rear compartment positioned rearward of the front cage in a longitudinal direction;
    a plurality of wheels supported by the frame structure, wherein the plurality of wheels includes a pair of front wheels and a pair of rear wheels positioned rearward of the pair of front wheels in the longitudinal direction;
    a plurality of electric motors to generate rotational power that are supported by the plurality of wheels, wherein each of the plurality of electric motors is integrated directly into one of the plurality of wheels; and
    a power cell assembly to supply electrical power to the plurality of electric motors that is supported by the frame structure, wherein the power cell assembly is at least partially housed by a carrier positioned between the pair of front wheels and the pair of rear wheels in the longitudinal direction,
    wherein the frame structure includes a pair of rails that each extends from a first end arranged forward of the pair of front wheels in the longitudinal direction to a second end arranged rearward of the pair of rear wheels in the longitudinal direction, wherein the pair of rails are spaced apart a first distance from one another in the location of the carrier, wherein the pair of rails are spaced apart a second distance from one another in a location forward of the carrier that is less than the first distance, and wherein the pair of rails are spaced apart a third distance from one another in a location rearward of the carrier that is less than the first distance and greater than the second distance.

11. The land vehicle of claim 10, wherein the operator cabin comprises:

a steering wheel;

an operator seat; and a rack arranged in the operator cabin opposite the steering wheel and the operator seat that includes a plurality of trays.

12. The land vehicle of claim 11, wherein:

the operator cabin comprises a pair of tracks affixed to a floor of the operator cabin and spaced apart from one another in the longitudinal direction; and the rack is movable along the pair of tracks in a lateral direction perpendicular to the longitudinal direction between a stowed position, in which the rack is disposed distant from the operator seat, and a delivery position, in which the rack is disposed close to the operator seat.

13. The land vehicle of claim 10, wherein each of the plurality of electric motors is coupled to one of the plurality of wheels without any transmission gearing interposed therebetween.

14. The land vehicle of claim 13, wherein the plurality of electric motors comprises:

a first electric motor integrated directly into one of the pair of front wheels;

a second electric motor integrated directly into the other of the pair of front wheels;

a third electric motor integrated directly into one of the pair of rear wheels; and a fourth electric motor integrated directly into the other of the pair of rear wheels.

15. The land vehicle of claim 10, wherein the power cell assembly comprises:

a bottom tray;

a casing supported by the bottom tray that houses a plurality of cooling plates to dissipate heat generated by the power cell assembly in use thereof;

an intermediate tray at least partially positioned in the casing;

a plurality of power cells at least partially positioned in the intermediate tray; and a top cover that cooperates with the bottom tray, the casing, and the intermediate tray to at least partially enclose the plurality of power cells.

16. The land vehicle of claim 15, further comprising a second power cell assembly to supply electrical power to the plurality of electric motors that is supported by the frame structure, wherein the second power cell assembly is at least partially housed by a second carrier that extends from a first end arranged forward of the pair of rear wheels in the longitudinal direction to a second end arranged rearward of the pair of rear wheels in the longitudinal direction.

* * * * *